(12) United States Patent
Sonnichsen et al.

(10) Patent No.: US 7,966,868 B1
(45) Date of Patent: Jun. 28, 2011

(54) SYSTEM AND METHOD FOR IMPOSING THERMAL GRADIENTS ON THIN WALLED TEST OBJECTS AND COMPONENTS

(75) Inventors: H. Eric Sonnichsen, Marlborough, MA (US); Robert L. Murner, Wilbraham, MA (US); Thomas L. Wolf, Winchester, MA (US)

(73) Assignee: Test Devices, Inc., Hudson, MA (US)

( * ) Notice: Subject to any disclaimer, the term of this patent is extended or adjusted under 35 U.S.C. 154(b) by 257 days.

(21) Appl. No.: 12/372,504

(22) Filed: Feb. 17, 2009

Related U.S. Application Data

(60) Provisional application No. 61/065,757, filed on Feb. 14, 2008.

(51) Int. Cl.
*G01M 15/14* (2006.01)

(52) U.S. Cl. .................................. 73/112.01; 73/118.03

(58) Field of Classification Search ............... 73/112.01, 73/112.03, 112.05, 116.03, 118.03
See application file for complete search history.

(56) References Cited

U.S. PATENT DOCUMENTS

| | | | | |
|---|---|---|---|---|
| 5,078,009 A | * | 1/1992 | Lefebvre | 73/168 |
| 5,435,175 A | * | 7/1995 | Kramer et al. | 73/147 |
| 6,237,395 B1 | * | 5/2001 | Helgeson | 73/23.31 |
| 6,497,137 B2 | * | 12/2002 | Helgeson | 73/23.31 |
| 7,810,384 B2 | * | 10/2010 | Ono et al. | 73/112.01 |
| 2003/0070479 A1 | * | 4/2003 | Lacey, Jr. | 73/147 |
| 2004/0089065 A1 | * | 5/2004 | Lacey, Jr. | 73/147 |
| 2004/0216535 A1 | * | 11/2004 | Brostmeyer et al. | 73/865.6 |
| 2007/0089548 A1 | * | 4/2007 | Brostmeyer et al. | 73/866 |
| 2008/0236261 A1 | * | 10/2008 | Ono et al. | 73/112.01 |

* cited by examiner

*Primary Examiner* — Eric S McCall
(74) *Attorney, Agent, or Firm* — Weingarten, Schurgin, Gagnebin & Lebovici LLP

(57) ABSTRACT

A test facility provides high temperature, high pressure and high mass flow fluid to a test object to form a relatively large thermal gradient on the object. Energy in the fluid is recuperated to drive system components, such as a heat exchanger and a turbocharger compressor. A test chamber housing the test object can be arranged to conform to a contour of the test object. A control system permits independent variation of pressure, temperature, cooling fluid and fluid velocity, as well as mechanical loading on the test object. Noncontact, optical inspection measurement techniques can be employed to measure test chamber and/or test object parameters. The test object can be configured to direct cooling airflow to permit various temperature or pressure gradients to be implemented. The test facility is relatively inexpensive to operate and provides a significant cost advantage over testing conducted in a full gas turbine engine.

40 Claims, 12 Drawing Sheets

SYSTEM AND METHOD FOR IMPOSING THERMAL GRADIENTS ON THIN WALLED TEST OBJECTS AND COMPONENTS

CROSS REFERENCE TO RELATED APPLICATIONS

This application claims the benefit of U.S. Provisional Application No. 61/065,757, filed Feb. 14, 2008, the entire disclosure of which is hereby incorporated herein by reference.

STATEMENT REGARDING FEDERALLY SPONSORED RESEARCH OR DEVELOPMENT

This invention was made with government support under contract No. FA8650-08-M-2830 awarded by the United States Air Force. The government has certain rights in the invention.

BACKGROUND OF THE INVENTION

1. Field of the Invention

The disclosed system and method relate generally to generating a relatively large, or steep, thermal gradient on a test object, and relates more particularly to a test facility for generating a steep thermal gradient across a thin wall of a test object or actual component, particularly gas turbine engine components.

2. Description of Related Art

Current thermal and mechanical fatigue load (TMF) test methods do not include steep temperature gradients across thin walls, or thin coated walls, representative engine pressures and velocities, or the ability to perform boundary layer cooling measurements. Given the extensive testing used to generate durability and life prediction models, and the cost of full-up engine tests ($6M+ each), no cost-effective way to conduct representative TMF testing is presently available. Current blade/vane design methods are also very costly, often requiring several iterations to achieve a "best effort" solution, resulting in increases of many millions of dollars and months of schedule to an engine program.

Additionally, TMF related failures in engine hot sections are a critical factor driving class A mishaps, and low total accumulated cycles (TAC) useful life, Mean Time Between Failure (MTBF), and Mean Time Between Maintenance (MTBM). Improved testing is expected to result in advances in designs for blade and vane components that are more resistant to the effects of TMF. Enhanced component designs can lead to more advanced engines that may be capable of reaching 4300 TAC life for the hot section. Improved designs may also help legacy engines extend hot section life to 5000 or perhaps 6000 TACs. Such improvements in blade and vane durability could save hundreds of millions of dollars in future maintenance cost avoidance both for military and commercial operations.

Sophisticated models have been used to determine blade stress, temperature, and life, but it has been impracticable to date to correlate these models to test data. Calibration of the model involves varying parameters independently to learn their effects. In a gas turbine engine, varying parameters may realistically be carried out over a very narrow relative range.

Current finite element analysis (FEA) software can approximate the stresses (mechanical and thermal) on blades and vanes, but without correlation of boundary conditions to empirical testing, it is difficult to know how accurate the model is and what risk the deviation from the conservative approach represents. Additionally, with a better understanding of the interplay between thermal and mechanical stresses, velocities, pressure distributions, and cooling flow effects, more advanced blade/vane models, and therefore, more advanced designs will be possible.

Traditional induction thermal mechanical testing has been used to represent an engine operational environment. Current TMF heating methods include direct resistive, fuel burner, laser and other radiant methods, electromagnetic induction and immersion heating. Elevated isothermal through-wall conditions have also been used for thermal tests on specimens formed with materials that are relevant to blade and vane components. However, these specimens are typically constructed for thermal material tests, and often have a geometry that is not necessarily representative of practical blade and vane geometry. Such tests do not wholly represent engine operating conditions and the resulting data is subject to very conservative interpretation. A major limiting factor to achieving rapid representative thermal excursions within an appropriately representative test component is the inability to attain adequate heat flux under representative conditions.

The modern gas turbine engine flow path undergoes a dramatic series of axial temperature, velocity, and pressure changes from the fan inlet to low turbine discharge. Components in the flow path withstand an extremely hostile environment. For example, typical first stage turbine components experience:

Velocities of approximately 0.8 Mach

Temperatures approaching 3,2000° F. static, and 3,0800° F. relative

Pressure of 470 psia

Secondary cooling flow systems keep blades and vanes at lower temperatures than the main fluid path to maintain component strength and to avoid melting. Maintaining and controlling blade temperature is important to controlling transient blade growth to minimize tip rubbing and increase blade durability, and extend component life.

Attempting to control and phase thermal gradients on gas turbine engine components has so far proven highly impractical with existing methods. As a result, analytically based life prediction models have fallen well short of accurately predicting component life with the result of imposing serious financial burdens on operators. A major limiting factor to achieving rapid representative thermal excursions within the test component is the inability to attain adequate heat flux under representative conditions.

SUMMARY

The disclosed system and method provide a high mass-flow of high temperature and high pressure fluid to a test component in a test chamber to produce a relatively large thermal and/or pressure gradient. The thermal and/or pressure gradient can be produced on the test component through a thin wall, as well as in a radial or a chordwise orientation. A combustor and turbocharger may be used to generate the high mass-flow of high temperature and high pressure fluid. The test chamber has a particular configuration that can be specific to a particular test component. The configuration of the test chamber enhances the effectiveness of the high-mass flow fluid as applied to the particular test component. The test component can have relatively thin walls and may be provided with internal impingement cooling, which may be non-uniform. The test chamber may include a high temperature sapphire or quartz window to permit optical access to the test component for non-invasive or non-contact measurement. The particular test component may be formed to be substantially similar to a practical gas turbine engine component, such as a blade or a vane utilized in a hot section of a gas turbine engine. The test section may also be configured to test actual engine components. The particular test component may be formed to have certain features, such as, for example, a double wall design or structures to direct cooling air flow, including impingement cooling.

The disclosed system and method employs combustor technology with a turbocharger to create a test facility that emulates engine conditions without excessive energy consumption and high cost. The combustor technology and turbocharger are configured to achieve rapid representative thermal excursions within the test component to attain adequate heat flux to model conditions in a gas turbine engine. A compressed air source may also be used in combination with the turbocharger or combustor technology.

Energy consumption and costs are reduced by reusing and recapturing energy in the high mass flow, high temperature fluid output from the test chamber. The recaptured output can be used to drive other system components. Impingement cooling air, which may be non-uniform or focused within the test component, may also be used. The heating and cooling aspects of the system can be separately controlled and cycled on an independent basis to achieve specific testing profiles. The test component can be readily instrumented or be exposed for measurement with greater ease, reduced complexity and reduced cost than is typically possible in a corresponding full gas turbine engine test. The configuration of the test chamber can be specific to the test component to contribute to duplicating relative parameters, especially in a boundary layer area of the test component. The test chamber can also be configured to limit fluid mass flow to reduce thermal energy input specifications and increase efficiency.

BRIEF DESCRIPTION OF THE DRAWINGS

The disclosed system and method are described in greater detail below, with reference to the accompanying drawings, in which.

DETAILED DESCRIPTION

This application claims the benefit of U.S. Provisional Application No. 61/065,757, filed Feb. 14, 2008, the entire disclosure of which is hereby incorporated herein by reference.

In accordance with the disclosed system and method, there is provided a test facility that has a test chamber for housing a test component upon which is imposed a relatively large (steep) through-wall temperature gradient, such as, for example, 400° F. The test component may also be subjected to axial load and to internal impingement cooling that may be uniform, non-uniform or focused to a target location on the test component. The test facility provides an emulation of operational thermal and mechanical fatigue loads (TMF) in a gas turbine engine. The test facility can be used to contribute to producing enhanced service life predictions, as well as improved designs for gas turbine engine components.

In a gas turbine engine, parameter variation may realistically be carried out over a very narrow relative range. A facility that allows the independent variation of parameters over a wide range leads to a better understanding of the interactions among thermal loads, mechanical loads, pressure, velocity, and cooling flows. A capacity for a greater range of independent variation can lead to advantages such as reduced production and design costs, increased safety margins, improved durability, and design of longer life parts. A test facility according to the presently disclosed system and method directly supports the objectives of Versatile Affordable Advanced Turbine Engines (VAATE), Propulsion-Safety and Affordable Readiness (P-SAR), and the Engine Component Improvement Program (CIP). The test facility induces steep thermal gradients across coated or uncoated thin wall blades, stator vanes, or other test articles.

The test facility can be configured to test actual or simulated gas turbine engine blades or vanes, analogs, blade or vane sections, or full blades or vanes. Test objects, such as combinations of blades and vanes, or portions thereof, can be cascaded within the facility to attain a scaled efficiency while simulating actual gas turbine engine configurations. The disclosed system and method permits significantly simplified testing of complex component shapes, component features, such as cooling holes, thermal barrier coatings (TBC's), and the effects of film cooling.

Figure 1:
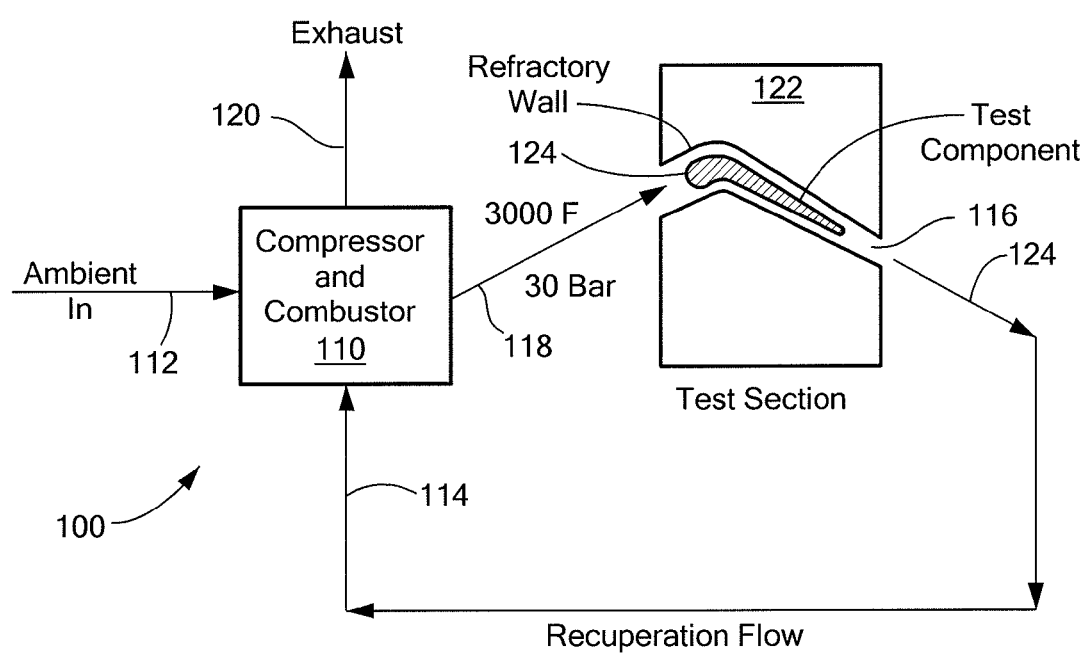
FIG. 1 is a block diagram of a test facility for imposing a steep thermal gradient on a test object in accordance with the disclosed system and method.

Referring now to FIG. 1, a highly simplified block diagram of a test facility 100 in accordance with an exemplary embodiment of the disclosed system and method is illustrated. Test facility 100 includes a compressor and combustor section 110 that has two inputs and two outputs. Input 112 provides ambient fluid input, such as ambient air at room temperature, such as 70° F., and at an ambient pressure, such as one (1) atmosphere. Input 114 is provided as a reused, recuperated flow taken from a test chamber 116. Input 114 provides a fluid input, such as a gas input, that can have varying temperature and pressure, for example, in relation to an output of test chamber 116. Compressor and combustor section 110 heats and compresses inputs 112, 114 to produce a high temperature, high mass fluid flow to test chamber 116 through output 118. The parameters of output 118 are exemplary illustrated as having a temperature of 3000° F. and a pressure of 30 BAR. Compressor and combustor section 110 also produces an output 120 that represents an exhaust output from section 110. Exhaust output 120 typically has relatively low temperature and pressure, as heat and pressure is recuperated within section 110.

A test section 122 houses test chamber 116 and receives output 118 from compressor and combustor section 110. Test section 122 can accommodate a test component 124 within test chamber 116. Test component 124 receives the high temperature, high pressure, high mass flow fluid applied through output 118 to test chamber 116. Test chamber 116 is contoured to have a particular shape corresponding to the geometry of test component 124. Generally, test component 124 models a gas turbine engine component, and test chamber 116 is contoured to test component 124 to contribute to emulating gas turbine engine operating conditions. For example, the contour of test chamber 116 may limit fluid flow around test component 124 to just beyond a boundary layer in which surface phenomena related to operation of test component 124 may take place. Some of the operating conditions that test chamber 116 simulates may include fluid velocity, pressure profiles or gradients, and temperature profiles or gradients found in gas turbine engines. In addition, the contour of test chamber 116 can limit the mass flow of the fluid passing around test component 124 to increase the efficiency of test facility 100, such as by reducing thermal energy input to achieve a desired thermal profile.

Test section 122 has an output 124, generally consisting of high temperature, high pressure fluid exiting test chamber 116. The energy content of the high temperature, high pressure fluid in output 124 is recycled and recuperated for application to input 114 for reuse in compressor and combustor section 110. The energetic fluid flow applied to input 114 can be used to drive components within section 110.

In FIG. 1, test facility 100 represents a stationary gas generator system that can be used to create a hot gas of suitable temperature, pressure, and flow. The hot gas flows across the surface of a stationary test component 124, at a relative velocity typical of engine operation. The generated engine flow field is substantially similar to that produced in an operating gas turbine engine, and is highly useful for test purposes. Total flow area in test section 122 may be limited to reduce the overall energy flow and thus reduce operating cost.

Figure 2:
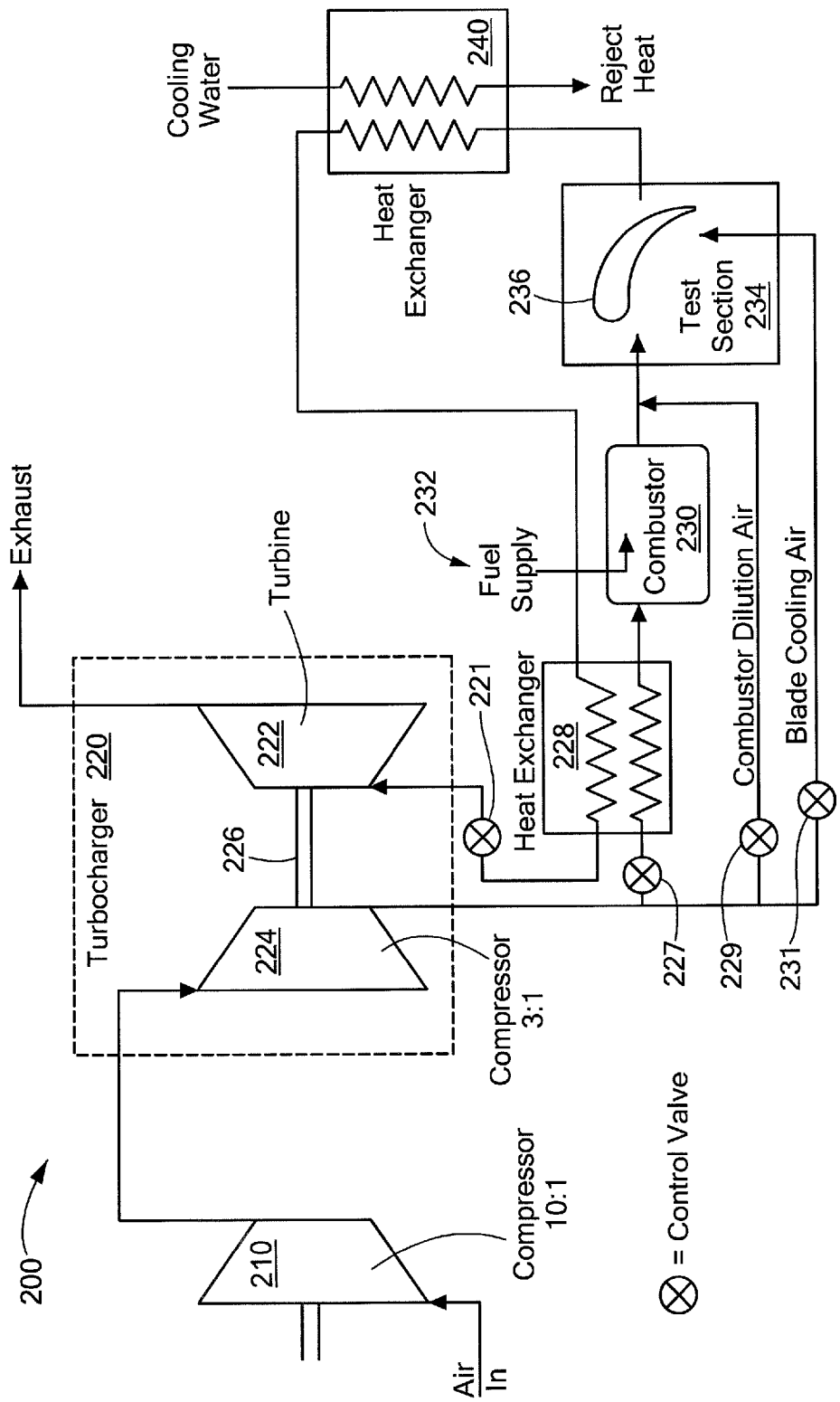
FIG. 2 is a schematic block diagram of a high temperature compressed fluid generation and recovery system in accordance with the disclosed system and method.

Referring now to FIG. 2, a system schematic diagram of an exemplary embodiment of a test facility 200 in accordance with the disclosed system and method is illustrated. Test facility 200 includes a compressor 210 that has ambient air as an input and can provide a compression ratio of 10:1, for example. The compressed air provided at an output of compressor 210 is supplied to a turbocharger 220, which has a drive turbine 222 and a compressor 224 coupled by a drive shaft 226. Turbocharger 220 can further compress the input compressed air, for example, at a compression ratio of 3:1, to output highly compressed air that can be used to emulate high pressure fluid applied to a test component. The output of turbocharger 220 provides compressed air at a high mass flow, which enables test facility 200 to emulate the high mass fluid flows generated by gas turbine engine operation.

The output of turbocharger 220 from compressor 224 is applied to a combustor 230 after passing through a heat exchanger 228. Heat exchanger 228 heats the compressed air output from turbocharger 220 prior to combustion in combustor 230. A supply of compressed air output from turbocharger 220 to heat exchanger 228 can be controlled through a control valve 227. The heated, compressed air supplied by heat exchanger 228 to combustor 230 is further heated and pressurized by combustion, using fuel supply 232. The high temperature, high pressure fluid provided at the output of combustor 230 is applied to a test section 234 that can house a test component 236. The input to test section 234 can be combined with combustor dilution air, as controlled by a control valve 229. Control valve 229 can control the temperature of the fluid supplied by combustor 230 and applied to test section 234 by controlling the amount of combined combustor dilution air. The high temperature, high pressure fluid applied to test section 234 has a high mass flow that is unique to test facility 200, which closely emulates operating conditions in a gas turbine engine to permit realistic operating conditions to be applied to test component 236.

Test component 236 may also be cooled, for example, with impingement cooling air provided through and controlled by a control valve 231. The cooling air can be selectively applied to different portions of test component 236, including internally or through different passageways or features arranged within test component 236. Cooling air can be used in combination with the high temperature, high mass flow fluid to form a relatively large thermal gradient on selected portions of test component 236. The high temperature, high pressure high mass flow fluid provided to test section 234 and applied to test component 236 is output from test section 234 to a heat exchanger 240. Heat exchanger 240 removes heat from the output of test section 234 using, for example, cooling water that produces reject heat. Heat exchanger 240 outputs fluid at a reduced temperature, which fluid is then applied to heat exchanger 228. Heat exchanger 228 removes further heat from the input fluid flow supplied by heat exchanger 240, and outputs a reduced temperature fluid that is applied to drive turbine 222 of turbocharger 220. A control valve 221 regulates the flow of fluid to drive turbine 222 from heat exchanger 228. After passing through and driving drive turbine 222, the fluid is exhausted out of turbocharger 220.

The embodiment illustrated as test facility 200 uses a commercially available industrial compressor system to supply compressed air at 10:1 pressure ratio over ambient. For example, compressor 210 produces 3200 SCFM (4 lb*m/sec) 150 psig air to supply test facility 200. Additional supply air can be made available with relative ease if desired.

The 10:1 supply air is further compressed with the 3:1 pressure ratio compressor stage represented by turbocharger 220. A drive turbine 224 of turbocharger 222 is driven by the hot gas exiting test section 234. Commercial turbochargers are available that can be suitably modified for operation at the power, flow, and speeds contemplated in the configuration illustrated in FIG. 2.

The disclosed system and method takes advantage of the highly favorable imbalance in component pressure ratio compared to conditions typical of turbocharger operation. The much higher pressure ratio for drive turbine 222 than compressor 224 provides a large surplus in turbine power, making the desired 3:1 pressure boost easily achievable despite throttling losses potentially introduced by a given control strategy. For the same reason, the approach illustrated in FIG. 2 remains workable at conservative turbine-inlet temperatures, and under much lower component efficiencies than customarily required for turbocharger operation.

Figure 3:
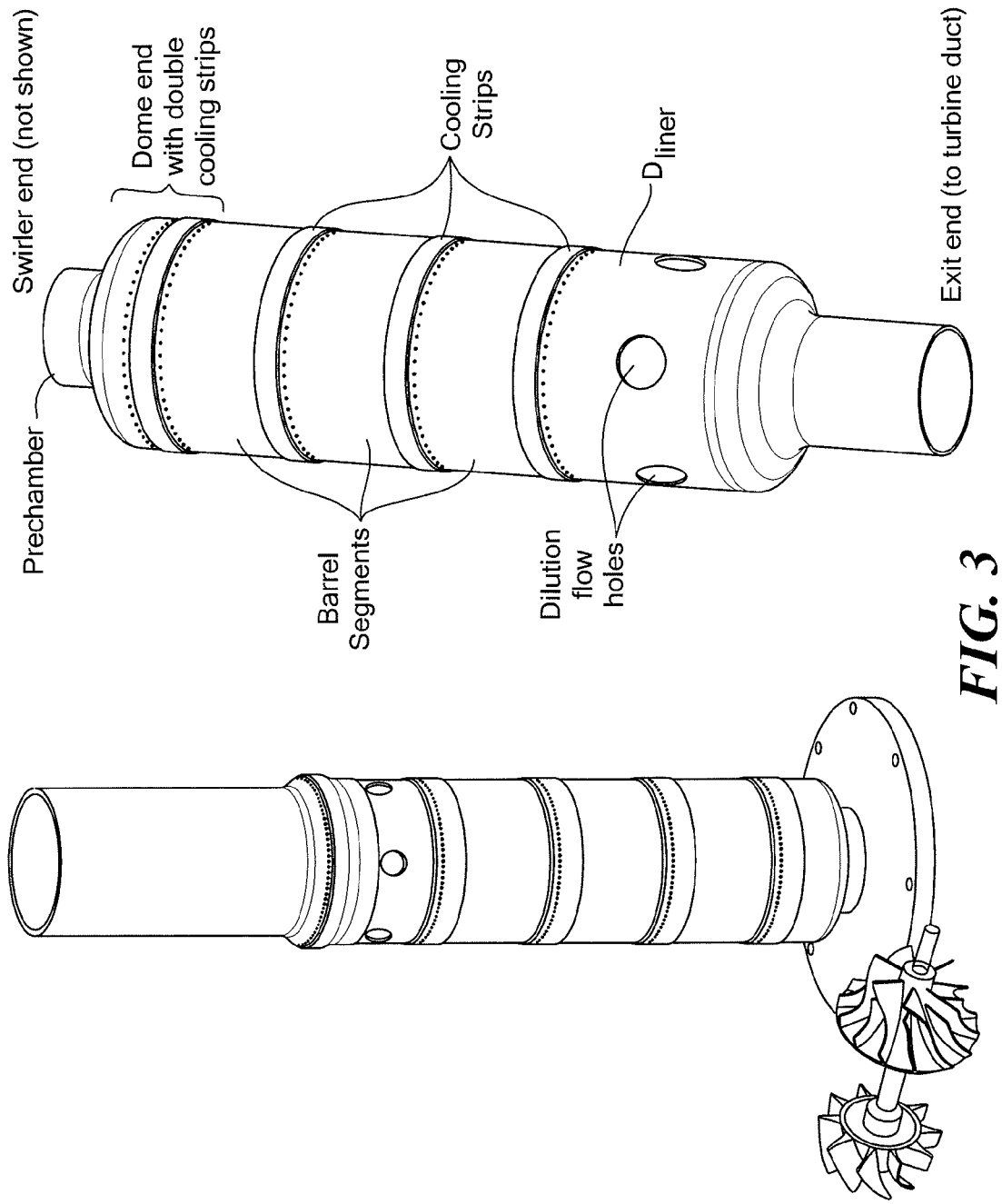
FIG. 3 is an illustration of a gas combustor suitable for use with the disclosed system and method.

The general specifications and sizing predictions for combustor 230 are summarized below in Table 1. At the given or expected temperatures and pressures, a commercially available standard gas turbine can combustor, such as is available from Brayton Energy of Hampton, N.H., can be modified and used to achieve embodiments of the disclosed system and method. An exemplary gas turbine combustor is illustrated in FIG. 3. The configuration of the combustor illustrated in FIG. 3 is well suited for implementation of the disclosed system and method, such as the implementation illustrated in FIG. 2.

The combustor prechamber and barrel employ film cooling and a method of construction proven to tolerate thermal cycling.

TABLE 1

Combustor specifications and predictions for gas turbine combustor

|  | SI | English |
|---|---|---|
| Mass flow rate, kg/s (lbm/s) | 1.816 | 4 |
| Exit Temperature, K (F) | 1922.2 | 3000 |
| Operating pressure, kPa (psia) | 3000 | 435 |
| Inlet temp (from recup), K (F) | 800 | 980 |
| Fuel | #2 Diesel | #2 Diesel |
| Pressure drop | 3.5% | 3.5% |
| Liner diameter, mm (in) | 78.5 | 3.09 |
| Air fuel ratio | 31.5 | 31.5 |
| Primary zone temp, K (F) | 1866 | 2899.3 |

Combustor 230 has a relatively high inlet fluid temperature that can be created by heat exchanger 228. For example, inlet fluid can be preheated by heat exchanger 228 to permit reduced operational cost.

Test section 234 can be configured to have an internal contour that closely matches the perimeter surface of test component 236. The operating cost of test facility 200 is substantially reduced by limiting the space between the surfaces of test component 236 and test section 234. The space is typically smaller than in an engine implementation. While it is important to match gas conditions in the vicinity of test component 236, a great deal of the gas flow in the engine does not have a strong thermal interaction with the components such as blades and vanes and can therefore be reduced in the passage of test section 234. According to an exemplary embodiment, the critical portion of the gas flow is limited to the volume defined by an appropriate multiple of the boundary layer thickness and a height of test section 234. Because the boundary layer is only a few thousandths of an inch thick, the passage in test section 234 can be a significant multiple of that dimension without using excessive hot gas mass flow. This reduced flow does not degrade the fidelity of the test.

Figure 4:
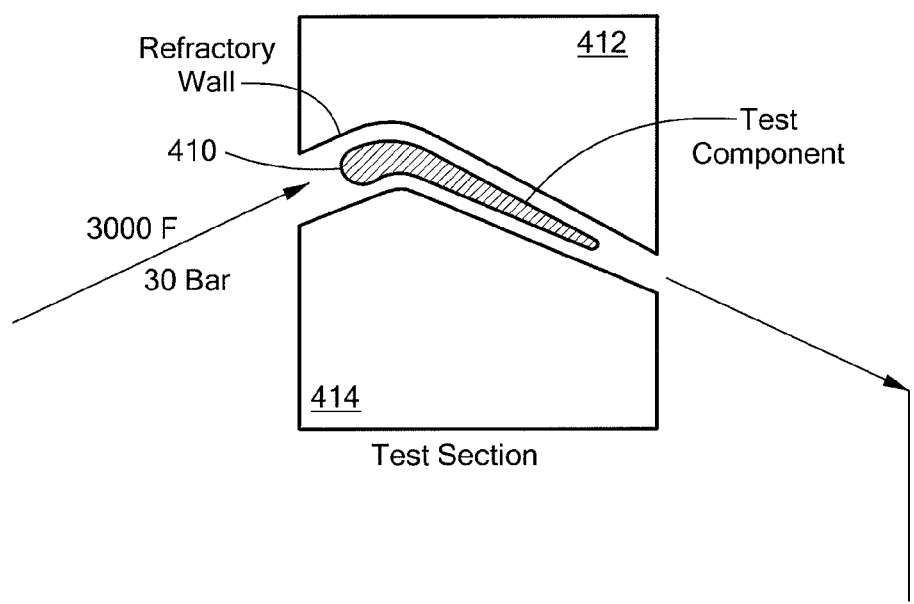
FIG. 4 is a side elevation diagram of a test section in accordance with the disclosed system and method.

Referring to FIG. 4, very high temperature gas flows across a candidate test component 410 downstream of combustor 230. The passage includes test component 410, which may be a blade or a vane, for example, and a flow restrictor block 412, 414 on each side of the passage. Restrictor blocks 412, 414 are machined with a contour matching the blade surface but standing off test component 410 by approximately 0.12 in (30 mm), for example. Restrictor blocks 412, 414 are designed for each test article and are intended to be easily replaceable.

With a passage width of 0.12 on each side and a blade height 2.75 root-tip, 4 lb/sec mass flow at 3000° F. produces a streamline velocity of about 2300 ft/sec (about Mach 0.9).

Test facility 200 can use the energy of the flow downstream of test section 234 to pre-heat input air provided to combustor 230. Heat exchanger 228 can be configured as a stationary recuperator that lowers the temperature of the exit gas fluid by recycling a major fraction of its thermal energy to the gas fluid entering combustor 230. The recuperated energy substantially reduces the fuel flow used to achieve 2500° F. gas temperature in test section 234, for example.

Referring again to FIG. 2, exhaust air from test section 234 is pre-cooled through a gas-liquid heat exchanger 240 to simplify duct fitting selection, and then passed through a recuperator or heat exchanger 228 to heat the output from turbine air compressor 224 prior to entry into combustor 230. Preheating the high pressure, high mass flow gas fluid supplied to combustor 230 can result in significant fuel and cost savings in operating test facility 200.

Test facility 200 ducts the exhaust from test section 234 through heat exchangers 240, 228 and then through drive turbine 222 of modified commercial turbocharger 220. Turbocharger 220 thus provides a pressure boost above the existing industrial level compressed air supply. A recuperator (not shown) is optionally positioned downstream of the output of drive turbine 222 for additional energy conservation. This innovative arrangement significantly reduces the hourly cost of operation of test facility 200, while using modified commercially available hardware to produce the desired high operating pressure without major capital investment in stationary booster compressors.

A gas to air recuperator (not shown) can reduce fuel consumption and may be used in long term operation implementations. The cost of a gas-to-air recuperator may be a factor for determining inclusion in a given embodiment of the test facility. Air flowing from heat exchanger 228 remains at a significantly higher enthalpy level above a threshold level used to drive turbocharger 220, providing a 3:1 boost of the output of compressor 210. Compressor 210 may, for example provide a 150 psi supply air, which is boosted to approximately 450 psia by turbocharger 220.

Flow and pressure control for test section 234 are achieved by modulating flow-control and speed-control valves, respectively, recognizing that compressor speed corresponds directly to pressure ratio. For example, control valve 221 can be used to regulate an input to drive turbine 222 of turbocharger 220 to control the speed of compressor 224. In addition, control valve 227 can be used to control an input to heat exchanger 228 to regulate the flow and pressure of fluid supplied to test section 234. Temperature of test section 234 can be controlled through modulation of fuel flow to combustor 230, as well as regulation of dilution air supplied to combustor 230 through control valve 229.

Using commercially available turbocharger hardware, peak turbine-inlet temperature is limited to around 1400° F. for sustained operation. Thermal cooling is therefore applied upstream of drive turbine 222 of turbocharger 220. According to one exemplary embodiment, a water loop heat exchanger 240 is contemplated. A gas-to-air heat exchange may also be used.

Test facility 200 provides several important aspects and features of the disclosed system and method: (1) a high mass flow fluid supplied by turbocharger 220; (2) recuperated and reused thermal energy obtained through heat exchanger 228; and (3) the creation and use of a drive fluid applied to drive turbine 222 of turbocharger 220. Each of these features contributes to producing a realistic test environment for gas turbine engine components or component models, while significantly reducing operating costs and complexity in a test facility. Cooling air supplied, for example, to a core of test component 236, also contributes to creating thermodynamic conditions at a surface of test component 236 that approximate those obtained in an operating gas turbine engine. Test facility 200 can produce a relatively large thermal gradient at a wall of test component 236, which thermal gradient is unavailable in other forms of known thermodynamic testing facilities.

Test section 234 may also include a mechanism (not shown) for applying mechanical load stress to test component 236. The load stress can contribute to emulating mechanical loads produced in an operating gas turbine engine. By providing both thermal and mechanical loading on test component 236, realistic operating conditions can be reproduced in test section 234 to advance an understanding of component design at significantly reduced cost. Test facility 200 includes controls for temperature, pressure and mechanical loading that can permit test cycling to approximate temperature, pressure, flow velocity and loading stress that is typical of gas turbine engine conditions.

Compressor 210 may be provided as an industrial air compressor that is readily available through ordinary commercial channels. Test instrumentation, data acquisition and other parameter inspection equipment can be more easily applied in test facility 200 than in a full operating gas turbine engine, significantly reducing cost, test project set up time and complexity for reproducing operating conditions on a test component. Such instrumentation systems, data acquisition and other inspection systems are available from Test Devices, Inc. of Hudson, Mass.

Figure 5:
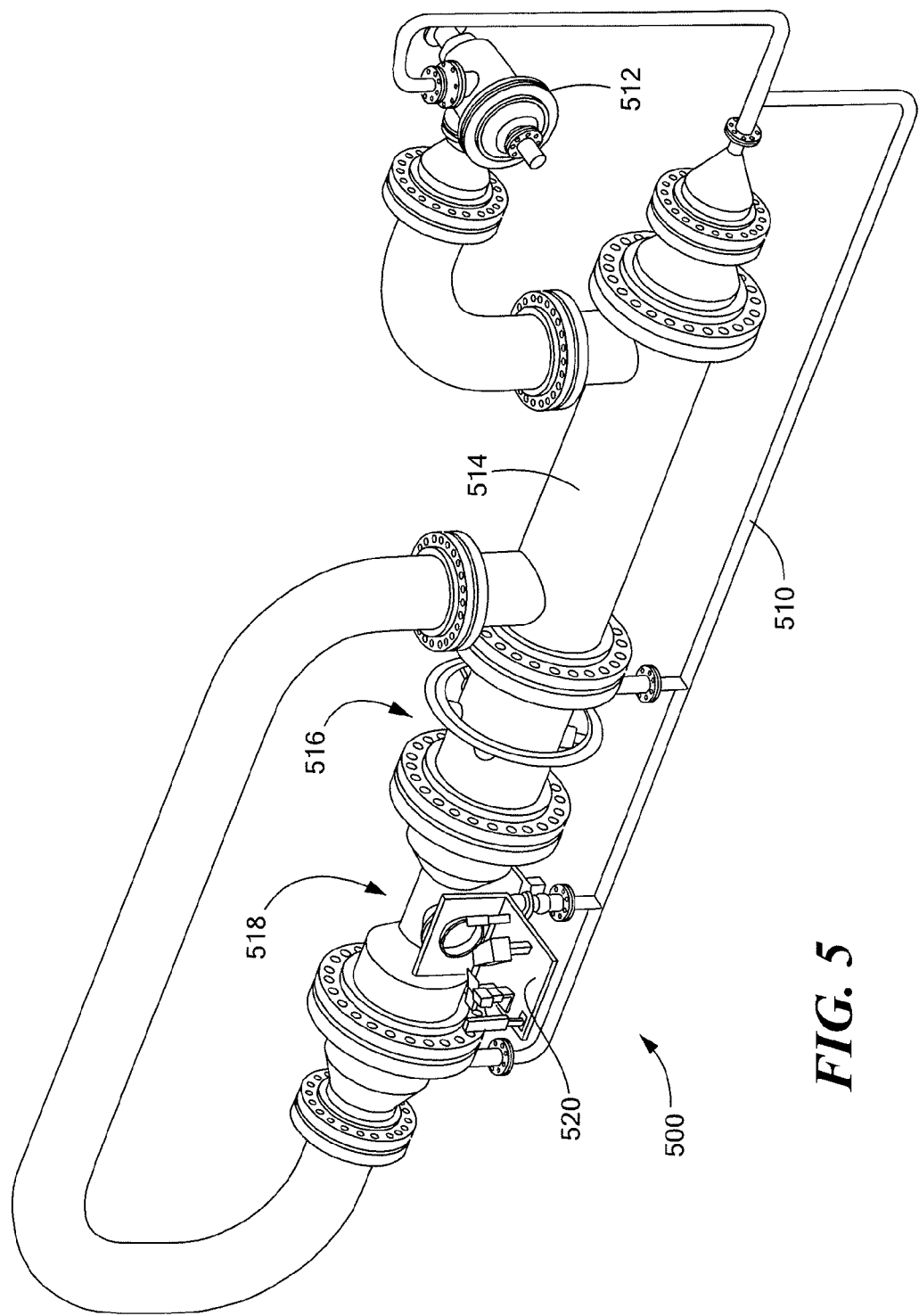
FIG. 5 is a perspective view of an embodiment of a test facility in accordance with the disclosed system and method.

FIG. 5 illustrates an exemplary physical embodiment of a test facility 500, which can implement test facility 200. Test facility 500 includes bypass air 510, which is used to control various portions of test facility 500. For example, bypass air 510 can be used to control speed and pressure in a turbocharger 512, as well as to control temperature of a fluid supplied to a test section 518, as discussed above with respect to control of test facility 200. Turbocharger 512 receives a driving input to a drive turbine from a recuperator 514. A compressor output of turbocharger 512 is provided to recuperator 514. Turbocharger 512 has as an input a compressed air supply, which can be taken from a commercially available compressor. The high mass flow, high pressure fluid produced by turbocharger 512, passes through recuperator 514 and is supplied to a combustor 516. Combustor 516 uses a fuel supply to provide combustion to increase temperature and pressure of the high mass flow fluid, which is then supplied to a test section 518. The high pressure, high temperature, high mass flow fluid is applied to a test component within test section 518, and then exhausted to be returned to recuperator 514. Test facility 500 also illustrates optical instrumentation 520 used to measure parameters related to testing of the test component within test section 518.

Figure 6:
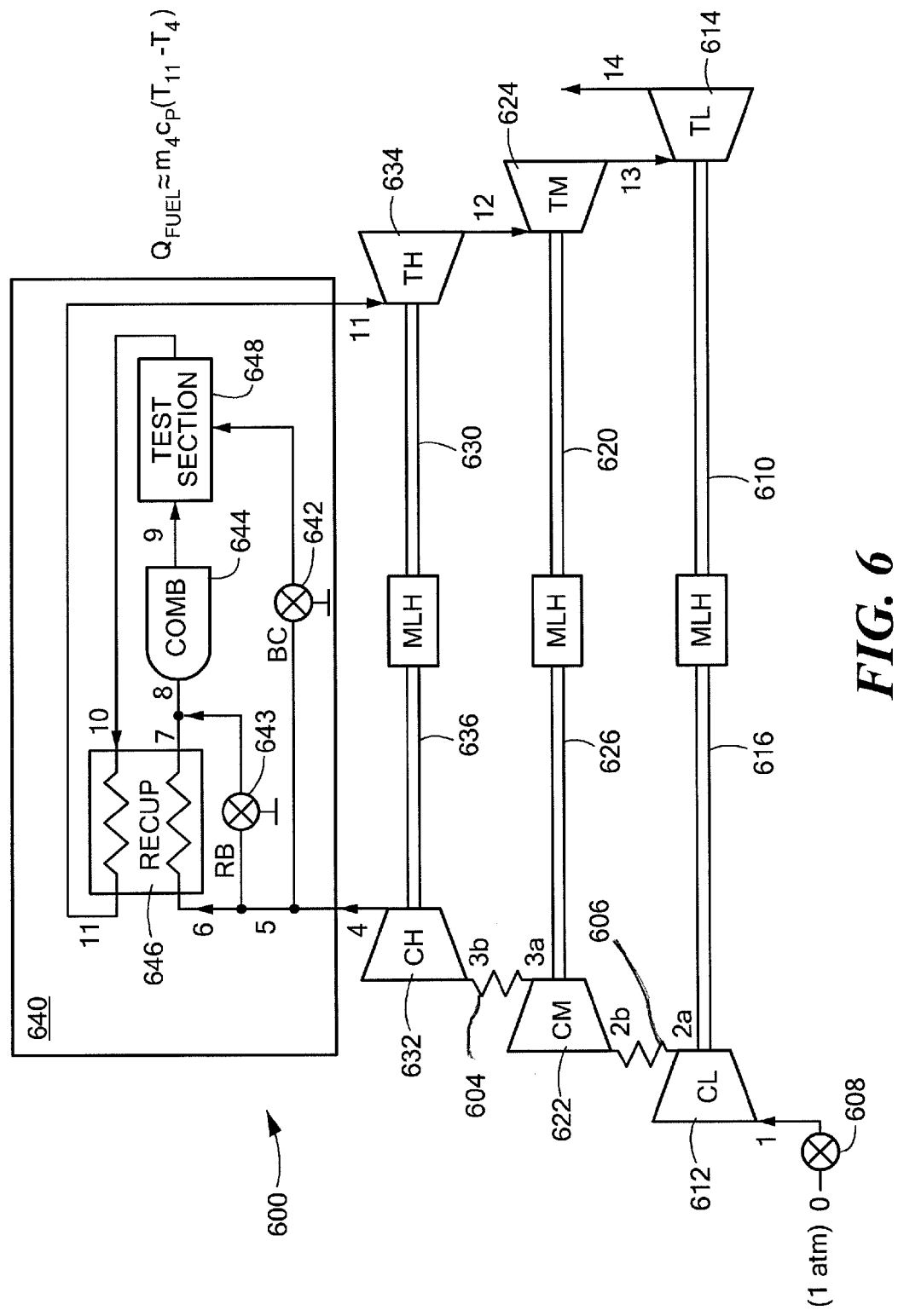
FIG. 6 is a schematic diagram of an embodiment of a test facility with a turbocharger cascade in accordance with the disclosed system and method.

Referring to FIG. 6, another embodiment of a test facility 600 is illustrated. Test facility 600 has three turbochargers coupled together in a sequential arrangement to produce high-pressure input fluid with a high mass flow that can be applied to a test section 648. A low range turbocharger 610 has a compressor 612 and a drive turbine 614 that are coupled together through a drive shaft 616. Turbocharger 610 receives an ambient air input on compressor 612 through control valve 608. As turbocharger 610 operates, by drive turbine 614 being driven to rotate compressor 612 through drive shaft 616, compressed air is produced and output from compressor 612. The output of compressor 612 is applied to an intercooler 606, which removes thermal energy from the fluid output of compressor 612. Intercooler 606 also causes a slight reduction in output pressure of compressor 612. The use of intercooler 606 to remove the thermal energy from the output of compressor 612 allows the compressed fluid to be applied to a next stage compressor without special modification to the compressor. That is, without intercooler 606, a next stage compressor receiving a direct output from compressor 612 is modified to withstand a high temperature input. Such a modification to a compressor is relatively expensive and can form a significant portion of overall system expense. Accordingly, the use of intercooler 606 to remove thermal energy from the output of compressor 612 permits a next stage compressor to be implemented with a generally commercially available compressor, leading to a significant cost savings.

A midrange turbocharger 620 is arranged as a next stage turbocharger that is coupled to turbocharger 610. Turbocharger 620 has a compressor 622 and a drive turbine 624 that are coupled together through a drive shaft 626. Turbocharger 620 receives a fluid input on compressor turbine 622 from compressor 612 through intercooler 606. As turbocharger 620 operates, by drive turbine 624 being driven to rotate compressor 622 through drive shaft 626, a compressed air boost is produced and output from compressor 622. The output of compressor 622 is applied to an intercooler 604, which removes thermal energy from the fluid output of compressor 622. Intercooler 604 also causes a slight reduction in output pressure of compressor 622. The use of intercooler 604 to remove the thermal energy from the output of compressor 622 allows the compressed fluid to be applied to a next stage compressor without special modification to the compressor, as discussed above.

A high range turbocharger 630 is arranged as a next stage turbocharger that is coupled to turbocharger 620. Turbocharger 630 has a compressor 632 and a drive turbine 634 that are coupled together through a drive shaft 636. Turbocharger 630 receives a fluid input on compressor 632 from compressor 622 through intercooler 604. As turbocharger 630 operates, by drive turbine 634 being driven to rotate compressor 632 through drive shaft 636, a compressed air boost is produced and output from compressor 632. The output of compressor 632 is applied to an input of a section 640, which is substantially similar to a corresponding section illustrated in FIG. 2. The output of compressor 632 provides a high-pressure, high mass flow transferred to test section 648 within section 640.

The components illustrated in section 640 operate substantially similar to the corresponding components illustrated and described with respect to FIG. 2. Importantly, and output of test section 648 passes through a recuperator or heat exchanger 646, which removes thermal energy from the exhausted fluid from test section 648. The high-pressure, high mass flow fluid output from heat exchanger 646 is provided to drive turbine 634 of high range turbocharger 630. The high-pressure, high mass flow fluid drives drive turbine 634, which in turn drives compressor 632 through drive shaft 636, to produce high range compressed fluid supplied to section 640.

After driving drive turbine 634, the high-pressure, high mass flow fluid is exhausted to drive turbine 624 of midrange turbocharger 620. The exhaust flow from drive turbine 634 drives drive turbine 624, which in turn drives a compressor 622 through drive shaft 626, to produce midrange compressed fluid supplied to compressor 632 through intercooler 604.

After driving drive turbine 624, the high-pressure, high mass flow fluid is exhausted to drive turbine 614 of midrange turbocharger 610. The exhaust flow from drive turbine 624 drives drive turbine 614, which in turn drives a compressor 612 through drive shaft 616, to produce low range compressed fluid supplied to compressor 622 through intercooler 606.

The three commercial turbochargers 610, 620 and 630 arranged in series can produce 30 atmospheres pressure without using an external compressed air supply. Each of turbochargers 610, 620 and 630 (turbocompressors) operate at about a 3.2 pressure ratio, producing a combined ratio of about 32:1. Intercoolers 604, 606 extract thermal energy from the exit air from the low and midrange compressor stages so that the exit air is cooled to near ambient. Intercoolers 604, 606 may be implemented as water cooled heat exchangers. The cooling action offered by intercoolers 604, 606 helps to improve cycle efficiency and permit the use of commercially available machines.

A portion of the high pressure fluid produced by compressor 632 flows to test section 648 for cooling the test component through a control throttle valve 642. Bypass air is also used to control the output temperature of combustor 644 through regulation provided by control valve 643. Bypass air can optionally be used to cool the fluid output of test section 648 if desired, which can help to keep the hot side inlet of recuperator 646 below 1900° F. A major portion of the high pressure fluid flows through recuperator 646 and combustor 644, raising the fluid temperature to a peak of 2500° F. as it enters test section 648. Losses in recuperator 646 and combustor 644 tend to reduce inlet pressure of the fluid applied to test section 648 to about 30 Atm.

Figure 7:
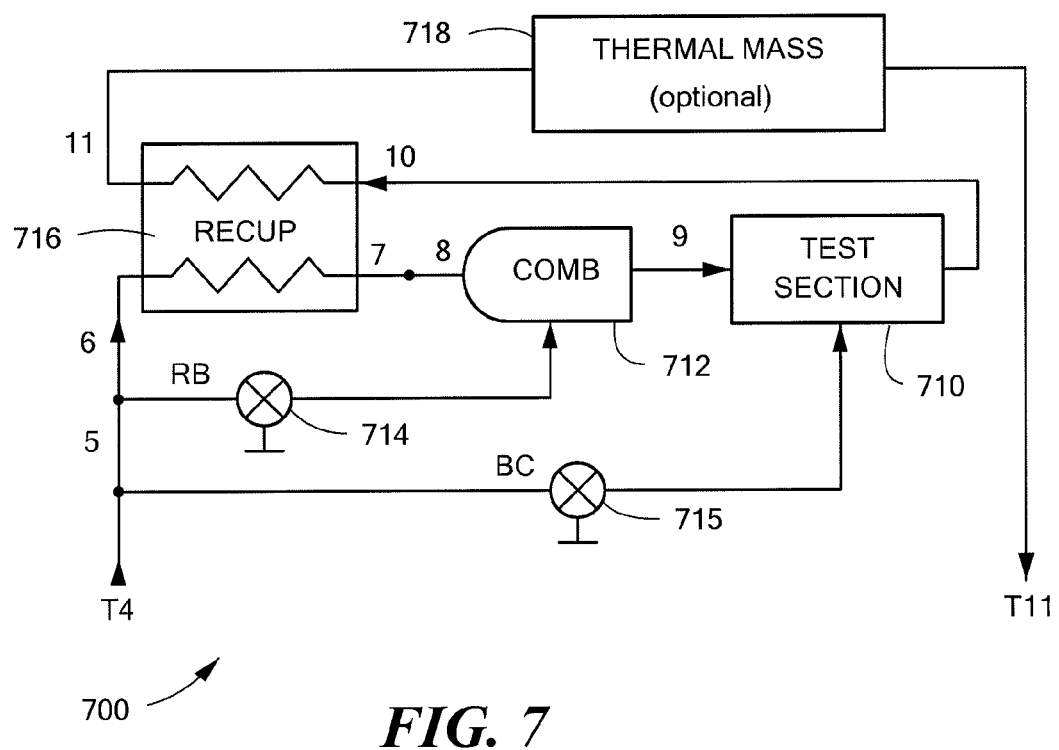
FIG. 7 is a schematic diagram of a portion of a test facility embodiment illustrating control strategies in accordance with the disclosed system and method.

Referring now to FIG. 7, and implementation of a control strategy is illustrated in a test facility section 700. Section 700 can be implemented as section 640 illustrated in FIG. 6. The control strategy illustrated in section 700 permits test facility operation at a generally fixed flow and pressure, and independent of control measures used to regulate the temperature of test section 710. Transient temperature conditions are effectively damped by the thermal capacitance of recuperator 716 and/or with the optional addition of a thermal mass 718 in the loop path between test section 710 and a hot side of recuperator 716.

Fuel flow applied to combustor 712 determines the temperature difference between points T4 and T11. The ΔT determined by the difference in temperature between points T4 and T11 (T11–T4) establishes the pressure and flow within section 700, similar to section 640 illustrated in FIG. 6. The control parameters within the control volume of section 700 have little or no influence on pressure and flow seen in test section 710. Accordingly, section 700 may be used in conjunction with the compressor embodiment illustrated in FIG. 2, or that illustrated in FIG. 6.

By controlling fuel flow applied to combustor 712 and bypass air regulated with a control valve 714, rapid control modulations are made possible. For example, temperature changes in section 700 on the order of 160° F./Sec are readily available. The temperature is controlled through a single degree of freedom modulation of cold (~350° F.) recuperator bypass air into combustor 712. Bypass air is also used to center cool the test component, such as a blade, arranged within test section 710. A control valve 715 can be used to regulate cooling air applied to the test component arranged in test section 710. Optionally, a bypass air cooling loop (not shown) can be provided to reduce the temperature of fluid exhausted from test section 710.

The controls illustrated in section 700 are similar to gas turbine engine controls. According to one embodiment, a programmable control system used for high temperature spin testing is employed to manage the test facility. The programmable control system includes automatic control loops that can be readily programmed to manage the operation of the test facility.

The control system for controlling a test facility with the three turbocharger serial arrangement may be more complicated than the control system for implementing the test facility illustrated in FIG. 2, for example. The control system can include pressure transducers to measure and report pressure at different stages in the test facility. The above mentioned control system uses five (5) active transducers, and can accommodate additional transducers that may be used to measure and control the operation of the test facility. For example, transducers may be used to sense the following pressures, which can be critical to appropriate control of the test facility.

Recuperator inlet pressure
Combustor inlet static pressure
Test section static pressure
High range compressor inlet pressure
Test component cooling flow pressure
Fuel pressure
Low range compressor discharge pressure
Midrange compressor discharge pressure Fuel flow is measured with a turbine flow meter (not shown), and controlled with an industrial servo valve using a PID loop with fuel flow as the set-point. Air mass flow is measured at each turbocharger compressor inlet. Each turbocharger may have a once per revolution speed sensor serving as an input to a frequency to voltage transducer to monitor and control shaft speed. In the event of an overspeed condition or excessive acceleration, fuel flow can be cut off with a solenoid valve in series with the fuel pump.

Turbine compressor pressure ratio is calculated and monitored to prevent surge (compressor stall) during start-up or changes in test conditions. The control system may provide a stall margin table of speed vs. pressure ratio, and can limit fuel flow to prevent stall.

Thermocouples can be installed at various locations in the system, including critical control locations, and can be connected to signal conditioning modules as inputs to the control system. The control system can monitor each temperature and limit fuel flow to prevent overtemperature at each location. Redundant thermocouples may also be used to monitor and control test section temperature. An overtemperature setting can be established and set for each test component and test condition. A fuel cut-off valve can be implemented to provide immediate protection against out of control temperature. Several temperatures measurements are used to control and monitor the test facility as follows.

Ambient air
Low range compressor exit
Midrange compressor inlet
Midrange compressor exit
High range compressor inlet
High range compressor exit
Cooling water supply
Low-midrange intercooler exit
Mid-high range intercooler exit
Recuperator cold side exit
Recuperator hot side inlet
Recuperator hot side exit
Test section static temperature
Test component internal wall temperature
High range drive turbine inlet
Midrange drive turbine inlet
Low range drive turbine inlet In addition to the parameters shown above, there will be a controller for a test component stress loading system. That stress loading system includes a load cell external to the test section that can sense a value of loading stress applied to the test component. The load cell includes a loading cylinder that is actuated to apply loading stress to the test component. Pressure to the loading cylinder can be regulated with a servo valve with force being used as the control variable.

The multiple turbochargers, the recuperator, and the variable cooling flow act together to form a complex set of test conditions. Several control loops and multiple protective functions can be installed to manage the system with relatively simple operator inputs. Typically, test section temperature and pressure as well as cycle rate are sent using relatively low control values to maintain test facility conditions at a relatively low temperature.

Test section pressure is controlled by throttling the inlet to the first compressor stage, such as through actuation of control valve 608 (FIG. 6). Test section temperature is reduced by increasing a portion of bypass air that bypasses the recuperator. The bypass air reduces the amount of heat extracted from the exhaust fluid of the test section. The reduced exhaust temperature from the test section can be controlled to avoid a material reduction in the inlet temperature to the turbocharger set.

The turbocharger and combustor may use a high speed mechanical drive to start the flow and provide additional power until the combustor is lit and acceleration to stable operation occurs. In accordance with an exemplary embodiment, a drive turbine available from Test Devices Inc. of Hudson, Mass., such as model 604, is directly coupled to the low range turbocharger shaft for starting the system. The parasitic drag of that drive turbine is relatively small and need not be disconnected after start. If the drive turbine remains connected to the turbocharger shaft, it runs at the spool speed of the low range turbocharger. This arrangement can greatly simplify the mechanical design for the three turbocharger configuration.

Alternately, or in addition, compressed air can be injected at the compressor discharge for the high range turbocharger. In this instance, a diverter valve set can be installed to prevent backflow through the compressors, and can also provide combustion air during the acceleration phase. A control configuration for such a startup arrangement can be relatively straightforward conceptually, and may present a low cost solution for test facility startup.

Figure 8:
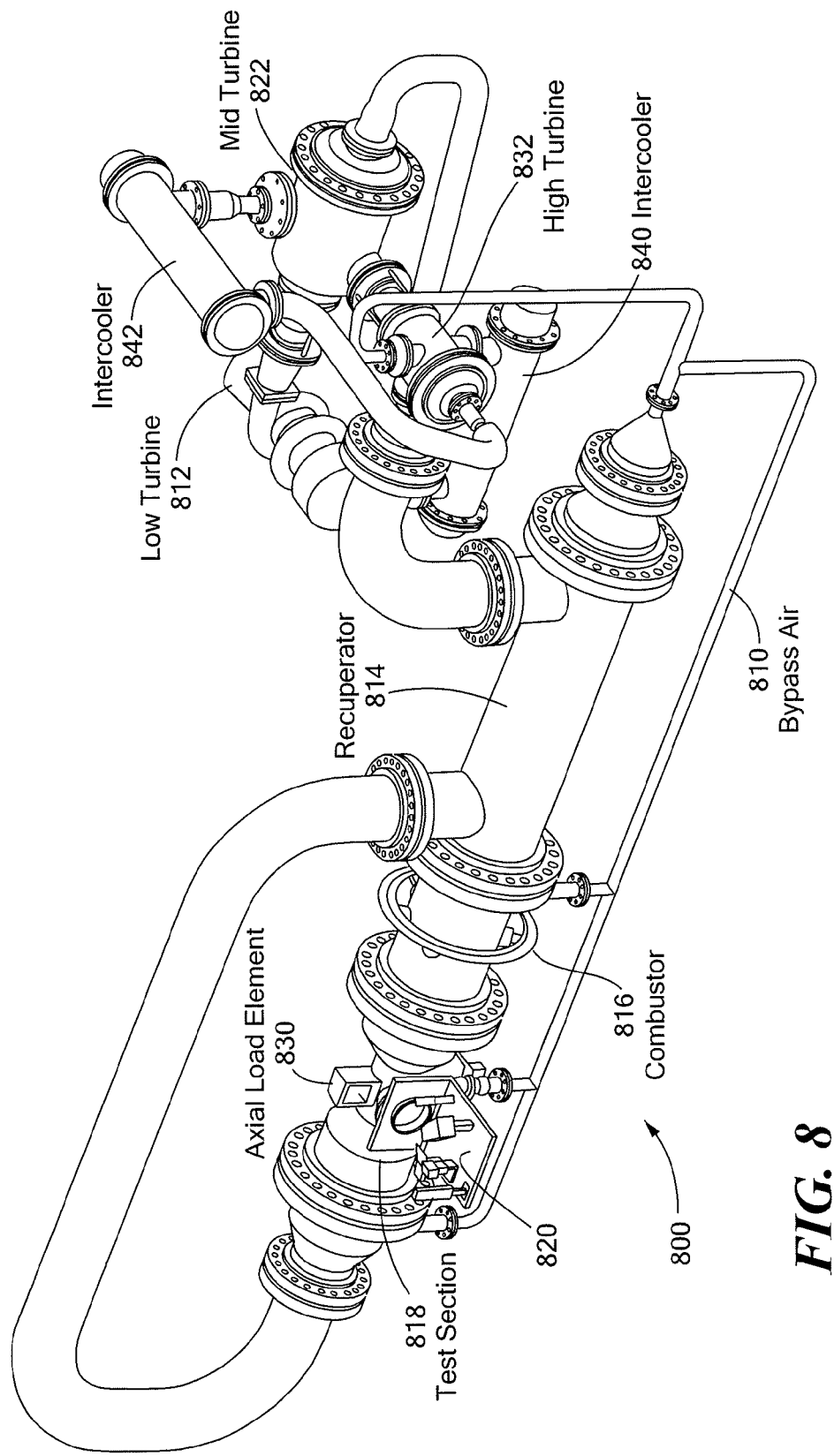
FIG. 8 is a perspective view of a test facility embodiment with a turbocharger cascade in accordance with the disclosed system and method.

Referring now to FIG. 8 an exemplary physical embodiment of a test facility 800, which can implement test facility 600, is illustrated. Test facility 800 includes bypass air 810, which is used to control various portions of test facility 800. Test facility 800 is similar to the configuration of test facility 500 (FIG. 5) and includes a turbocharger stack for generating the high pressure, high mass flow fluid gas that can be applied to a test component.

The turbocharger stack consists of a low range turbocharger 812, a mid range turbocharger 822 and a high range turbocharger 832. Turbochargers 812, 822 and 832 are coupled together in a sequentially arrangement to highly compress input gas fluid (air) at a high mass flow rate. Pathways between the compressors of turbochargers 812, 822 and 832 have intercoolers 840, 842. Intercoolers 840, 842 reduce a temperature of the compressed air supplied from a compressor that is delivered to a next, higher stage compressor. For example, the output of the compressor of low range turbocharger 812 is applied to intercooler 840, an output of which is supplied to the input of the compressor of mid range turbocharger 822. The output of the compressor of mid range turbocharger 822 is supplied to intercooler 842, the output of which is supplied to the compressor of high range turbocharger 832. The high pressure, high mass flow gas fluid produced by the turbocharger stack is supplied to combustor 816 through recuperator 814. Intercoolers 840, 842 cause a relatively small drop in pressure while removing a relatively large amount of thermal energy from the high pressure, high mass flow gas fluid supplied to recuperator 814.

The high mass flow, high pressure gas fluid passes through recuperator 814 to combustor 816, which provides combustion in combination with a fuel supply to increase temperature and pressure of the gas fluid. The high temperature, high pressure, high mass flow gas fluid is then supplied to test section 818. The gas fluid is applied to a test component within test section 818 and then exhausted to be returned to recuperator 514. The exhaust gas fluid is cooled with recuperator 814, and supplied to the drive turbine of high range turbocharger 832. The exhaust from the drive turbine of high range turbocharger 832 is supplied to the drive turbine of mid range turbocharger 822, the exhaust of which is then supplied to the drive turbine of low range turbocharger 812. Accordingly, the recuperated high pressure fluid flow drives the turbocharger stack to produce the highly compressed, high mass flow gas fluid supplied to combustor 816. Recuperator 814 may preheat the high pressure, high mass flow gas fluid provided by the turbocharger stack using recuperated thermal energy from the exhaust of test section 818.

Test facility 800 also has an optical instrumentation 820 for obtaining non-destructive, non-interfering parameter measurements in relation to the test component. A load element 830 is also provided to test section 818 to impart a stress load on the test component, for example. The stress load can be axial, radial, or any other type of loading that may be configured based on connections with load element 830 and physical configuration of the test component. For example, a test component can be configured to have randomly located connection mounts that can be attached to load element 830 to permit various types of mechanical stress loading to be applied to the test component. Load element 830 can be a servo driven element that imparts stress loading on the test component based on a control profile that can be imposed in conjunction with thermal, pressure, velocity and other parameter profiles.

Figure 9:
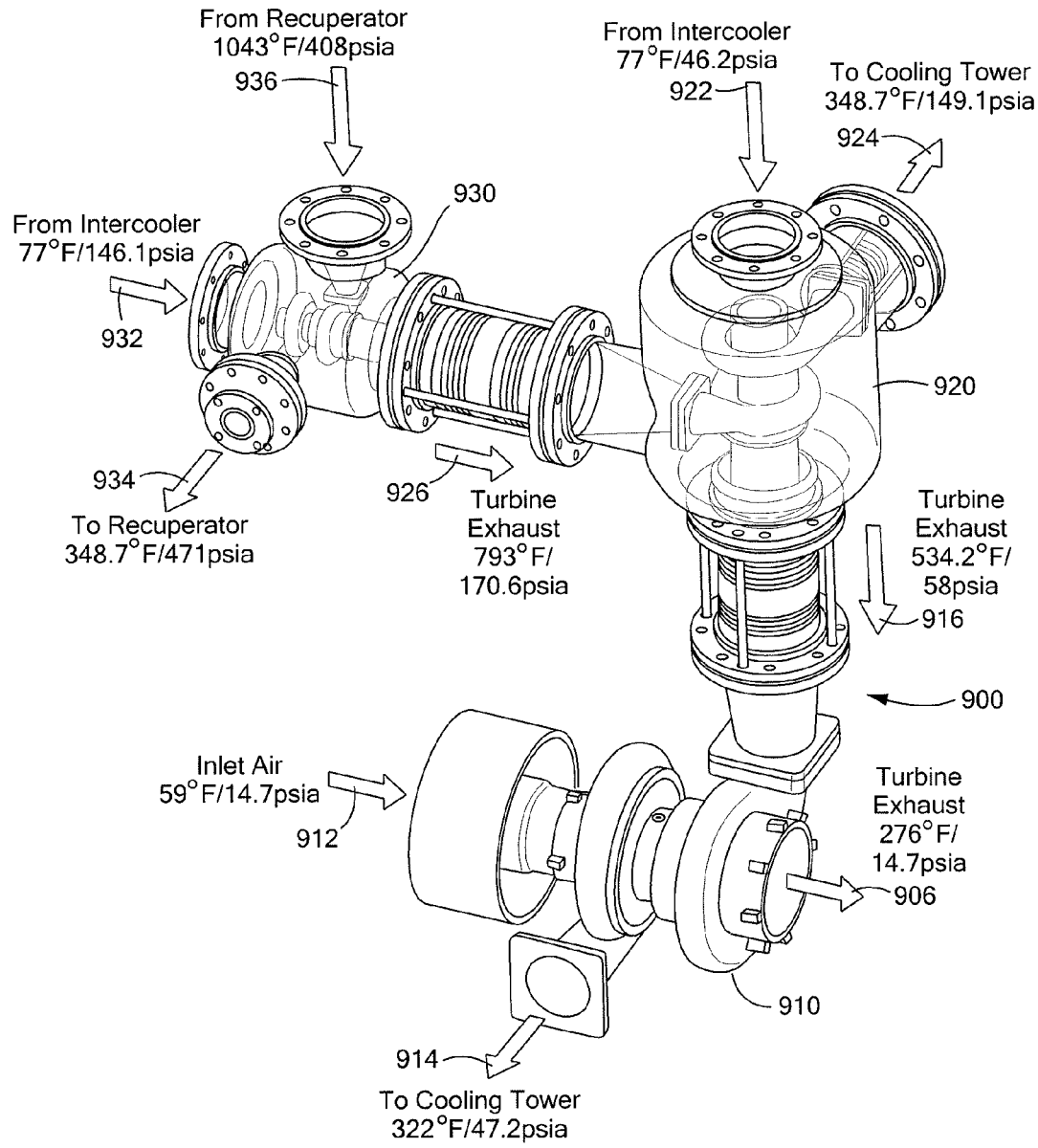
FIG. 9 is a perspective view of a turbocharger cascade in accordance with an embodiment of the disclosed system and method.

Referring now to FIG. 9, an exemplary embodiment of a high mass flow compressor 900 implemented with a three turbocharger serial arrangement is illustrated. A low range turbocharger 910 compresses inlet air and supplies the compressed air to a midrange turbocharger 920. Midrange turbocharger 920 compresses input air and supplies the further compressed air to a high range turbocharger 930. The output compressed air from turbocharger 930 provides the high pressure, high mass flow fluid supplied to the test chamber for application to the test component. Turbochargers 910, 920 and 930 (or turbocompressors) are modified commercial turbochargers chosen based on a suitable power level and pressure ratio. The casings of the turbochargers are designed for a pressure difference of about 50 psi, so midrange and high range turbochargers 920, 930 can be mounted inside pressure vessels to limit structural stress and consequent deformation.

Ambient airflow 912 enters the compressor of turbocharger 910 at 59° F. and 14.7 psia and is further compressed to approximately 47.2 psia at a temperature of 322° F., as indicated by airflow 914. Airflow 914 is directed to an intercooler, which produces airflow 922 with a temperature of 77° F. and a pressure of 46.2 psia. Airflow 922 is supplied to the compressor of midrange turbocharger 920, which produces airflow 924 with a pressure of 149.1 psia heated to a temperature of 348.7° F. Airflow 924 is directed to a second intercooler, which produces airflow 932 that has a temperature of 77° F. and a pressure of 146.1 psia. Cooled airflow 932 is applied to the compressor of high range turbocharger 930 to produce airflow 934 with a temperature of 348.7° F. and a pressure of 471 psia (32 Atm).

Airflow 934 is applied to the recuperator of the test facility, where it is heated, passed to the combustor and test section, and recirculated through the recuperator. The output of the recuperator is airflow 936, which has a temperature of 1043° F. and a pressure of 408 psia. Airflow 936 is applied to the drive turbine of turbocharger 930, which drives the compressor, before exiting as airflow 926. Airflow 926 as a temperature of 793° F. and a pressure of 170.6 psia as it is applied to the drive turbine of turbocharger 920. Airflow 926 drives the drive turbine of turbocharger 920, which in turn drives the midrange compressor. Airflow 916 is exhausted from the drive turbine of turbocharger 920, at a temperature of 534.2° F. and a pressure of 58 psia. Airflow 916 is applied to the drive turbine of turbocharger 910 to drive the low range compressor, before being exhausted as airflow 906. Airflow 906 as a temperature of 276° F. and a pressure of 14.7 psia, which is essentially ambient air pressure. Airflow 906 can be passed through a heat exchanger or other cooling mechanism to recover thermal energy from the low range drive turbine exhaust.

According to an embodiment of the disclosed system and method, a test sample is provided with a particular design that enables the creation of various fluid flows for understanding the complex relationships between thermodynamics and materials science in relation to designs for gas turbine engine components. The specific configuration of the test sample provided in the above described test chamber can be used to target specific portions of a test component. For example, the test component can be configured to permit locally focused temperatures, high temperature gradients, high pressures, high flow velocities and other specialized phenomena that can contribute to improving an understanding of physical issues encountered in realistic gas turbine engine operations.

Figure 10:
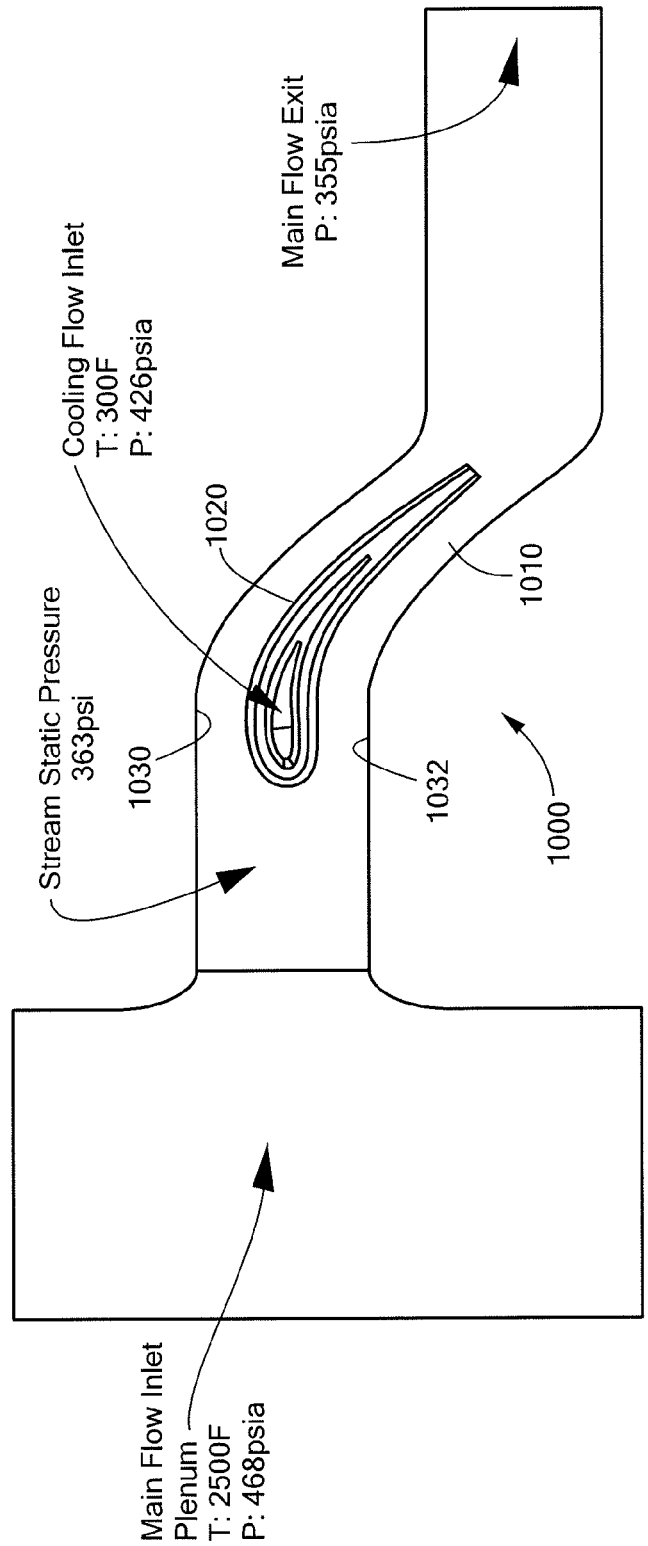
FIG. 10 is a diagram of a test section in accordance with an embodiment of the disclosed system and method.

Referring now to FIG. 10, a section of a test chamber 1000, that may be implemented as test section 234 is illustrated. Test chamber 1000 includes a contoured passage 1010 that is constructed to correspond with a contour of a test component 1020. FIG. 10 illustrates various exemplary parameters that may be experienced in test chamber 1000, as applied to test component 1020. As discussed above with respect to the test section illustrated in FIG. 4, passage 1010 includes a test component 1020, which may be a blade or a vane, for example, and a flow restrictor block on each side of the passage. The restrictor blocks are machined with a contour matching the surface but standing off test component 1020 by approximately 0.12 in. (30 mm), for example. With a clearance of 0.12 in. between each side of passage 1010 and test component 1020, and a blade height of 2.75 in. root-tip, 4 lb/sec mass flow at 3000° F. produces a streamline velocity of about 2300 ft/sec (about Mach 0.9).

Test component 1020 is configured as a double-walled blade component that models a like component of the hot section of a gas turbine engine. Due to the unique shape of test component 1020, walls 1030, 1032 are arranged to match a surface contour of test component 1020. Walls 1030, 1032 can be machined from refractory material to provide a clearance around test component 1020 that is several multiples of a boundary layer flowing over test component 1020 during testing operations. Because the boundary layer around test component 1020 during testing operations is on the order of a few thousands of an inch thick, the spacing between walls 1030, 1032 and test component 1020 can be made relatively small. By providing a relatively small space surrounding test component 1020, test chamber 1000 can achieve an increase in efficiency, since the reduced space for fluid flow reduces the amount of energy supplied to test chamber 1000 that is used to recreate desired conditions related to an operating gas turbine engine. In addition, the reduced spacing contributes to duplicating velocity and pressure profiles a corresponding component may experience in an operating gas turbine engine. The actual dimensions of test chamber 1000 and the contour of walls 1030, 1032 may be determined based on relevant test component geometry, desired conditions to be imparted to test component 1020 and may be determined by sophisticated modeling techniques that can provide an estimate of thermal, pressure and velocity values resulting from giving geometries of test chamber 1000.

Figure 11:
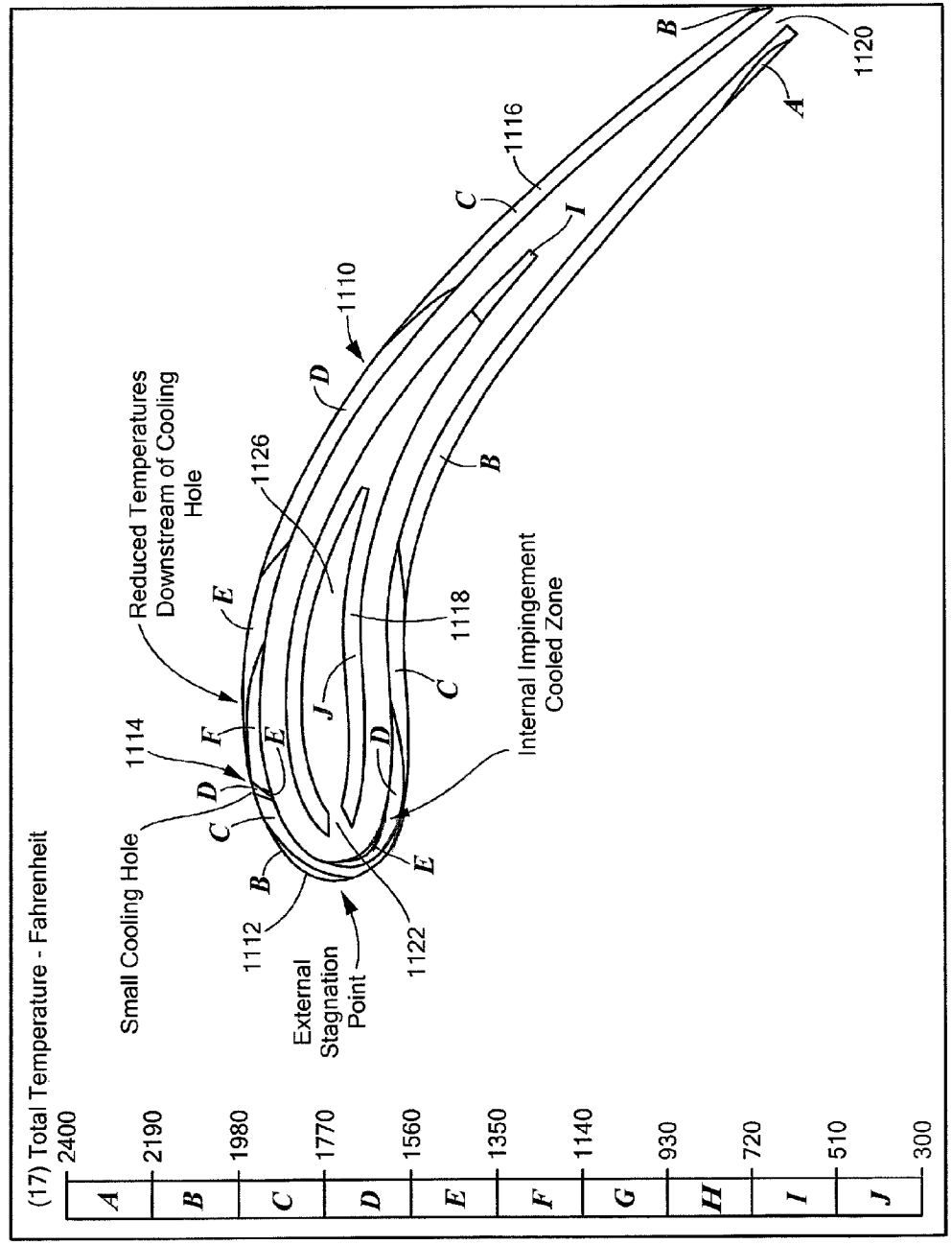
FIG. 11 is a graphical illustration of a test component.

Referring now to FIG. 11, an illustration of a test component 1110 with relevant analysis information is illustrated. A leading edge 1112 of test component 1110 represents an external stagnation point where relatively high temperatures can be observed. Test component 1110 has a relatively small cooling hole 1114 on an upper section following leading edge 1112. Cooling hole 1114 permits internally supplied cooling air to exit an internal portion of test component 1110 to permit fluid flow over a top edge of test component 1110 to be influenced by cooling air.

Test component 1110 is configured with a double wall arrangement so that an outer wall 1116 surrounds an inner wall 1118. Outer wall 1116 has an exit opening 1120 to permit cooling air supplied internally to test component 1110 to exit at a trailing edge. Inner wall 1118 includes an opening 1122 that can focus internally supplied cooling air toward leading edge 1112 of test component 1110. Cooling air can be supplied internally to inner wall 1118, such as in chamber 1126. The internally supplied cooling air provides internal impingement cooling that is separately controllable from the high temperature fluid generated and applied within test chamber 1000, for example. The cooling air can be focused, as illustrated with opening 1122 directed toward leading edge 1112, or can be permitted to flow in various orientations and profiles, dependent upon the configuration of the internal geometries of test component 1110. For example, cooling hole 1114 permits cooling air to flow to an external surface of test component 1110, thereby reducing temperatures downstream of cooling hole 1114. Cooling air can also flow externally to internal wall 1118, to provide impingement cooling for an internal surface of external wall 1116. The cooling air can absorb thermal energy from external wall 1116 and be exhausted through opening 1120 on a trailing edge.

The impingement cooling provided through opening 1122 directed toward leading edge 1112 creates a large thermal gradient between the external and internal surfaces of external wall 1116. The relatively large thermal gradient, such as on the order of 400□F is made possible by the configuration of the test facility in accordance with the disclosed system and method. As should be clear from the above discussion, various geometries of test component 1110 can be provided to produce relatively large through wall thermal gradients, radial gradients, cord wise gradients, and other types of thermal profiles that may be desired in a test component. In addition to thermal gradients, pressure gradients can also be provided in dependence upon the configuration of the test component geometry.

The high temperature, high pressure, high mass gas fluid flow produced by the test facility in accordance with the disclosed system and method, in combination with cooling air and test chamber and test component geometry can be used to recreate a wide variety of conditions, including those experienced within an operating gas turbine engine. The high temperature, high pressure, high mass flow gas fluid supplied to an outside of test component 1110 can be independently regulated or cycled with respect to the cooling air supplied internally to test component 1110. The cooling air applied internally to test component 1110 can also be varied and cycled independently of the externally supplied fluid flow to thereby permit cyclical testing of various thermal profiles, in conjunction with variations to pressure, velocity, and other parameters designed to be controllable within the test facility of the disclosed system and method.

Figure 12:
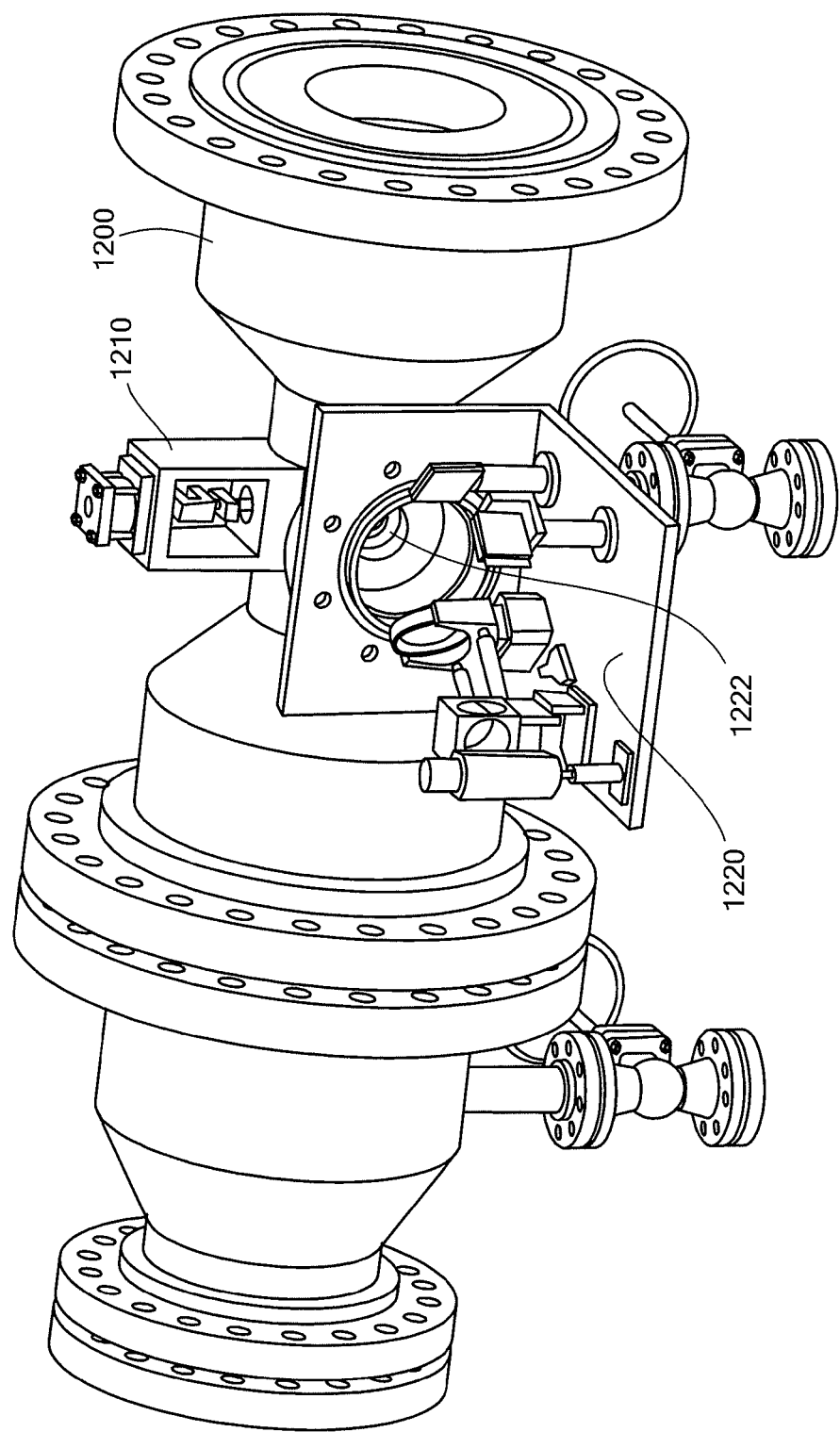
FIG. 12 is a perspective view of a section of a test facility in accordance with an embodiment of the disclosed system and method.

Referring now to FIG. 12, a perspective view of a test section 1200 is illustrated. Test section 1200 includes a load cell 1210 from posing a stress load on a test component in a test chamber of test section 1200. According to one exemplary embodiment, load cell 1210 is a servo-controlled hydraulic cylinder attached to a loading lug welded to a portion, such as a tip, of the test component. Load cell 1210 applies a stress load to the test component to emulate component loading experienced in an operating gas turbine engine. Reproduction of an equivalent gas turbine engine centrifugal load, which varies from zero at a blade tip to maximum at a blade root, can be somewhat challenging. Load cell 1210 is controlled with a programmable controller (not shown) in a closed loop using loading force as a control parameter. The load applied with load cell 1210 can be set to match an engine load at a particular region of interest along the blade radial axis, for example. Load cell 1210 can provide exemplary compressive and tensile loading in the range of +/−5000 pounds.

Load cell 1210 can be provided with a rod that penetrates the test section insulation to apply a load to the test component. The rod can pass through a gas buffered labyrinth seal that can be used to prevent leakage of high pressure, high temperature gas. The loading rod can be fabricated from high temperature material and may be internally cooled with compressed air to mitigate the challenge of providing a robust high temperature seal.

The loading system is suitable for applying tensile loads using a welded lug on test components such as blades or blade analogs. The loading rod can also be used to apply compressive loads that emulate constraint stress on test components such as stator vanes. Various configurations of the test component and loading rod can be implemented to obtain a variety of desired stress loading on the test component. For example, loading rod connections with various orientations can be implemented on the test component, internally or externally, to permit a wide variety of stress loading to be applied to the test component. The geometry of the test component can be modified to accommodate a specific loading profile implemented through load cell 1210. For example, radial, axial or chordwise loading, including tensile, compressive or sheer loading can be implemented with a given configuration of the test component in conjunction with operation of the loading rod by load cell 1210. Control of load cell 1210 can also be coordinated with pressure or temperature cycling, for example, to obtain useful dynamic data that can simulate practical conditions of an operating gas turbine engine.

FIG. 12 also illustrates an optical measurement tool 1220 map from its optical measurement of test chamber parameters through a window 1222 in test section 1200. Measuring temperatures and pressures in gas turbine engines represents serious instrumentation challenges by the nature of the operation of gas turbine engines. For example, strain gages and thermocouples usually do not survive relatively long tests. Optical measurement tool 1220 uses optical methods to measure temperature, pressure and strain distribution on a test component in test section 1200. A narrow portion of the test component, e.g. the area in the vicinity of a cooling hole of a blade, can be inspected using optical methods available with tool 1220. The high speed of optical inspection also provides advantages, such as permitting the measurement of three-dimensional strain on the observed surface of the test component. Tool 1220 can also retrieve large amounts of data using optical techniques, which can lead to such advantages as measurement of temperature distributions with relatively high resolution.

Tool 1220 permits a great deal of flexibility in measurement techniques, some of which are described below. Tool 1220 can take a thermal image of a test object to map the temperature distribution with a resolution of better than +/−20 F over a spatial resolution of 50 μm or 0.002 square inches. Tool 1220 can be operated to take an interferometric image of the test object while the object is deforming, e.g. under tensile load. The images can be taken using a high resolution CCD camera (1 k×1 k pixels with ~10 μm pixel size) at a video rate of 30 Hz (frame grabber). Tool 1220 can also take advantage of specialized illumination, such as can be accomplished with near-infrared laser light with low power, which is permits image capture by a visible range CCD).

Various illumination techniques can be used to apply a speckle pattern to the test object, which pattern can be observed by an image capture device. As the speckle pattern changes a comparison can be made with a reference pattern to identify correlation fringes representing the displacement of the object with a resolution of less than 1 μm. The image capture device can be a digital device, which permits storage of captured images on a PC, for example. Accordingly, a data acquisition card can acquire a large amount of measurement data using optical techniques for later analysis.

Tool 1220 permits test component strain measurement through Electronic Speckle Pattern Interferometry (ESPI). This technique projects a fixed fringe pattern onto the test object with two mutually coherent beams. A speckle pattern on the test object is captured using a digital camera. The captured speckle pattern can be analyzed as a function of the relative phase of two wave fronts. Measurements can be taken using a double exposure before and after strain (thermal and/or mechanical), during which the fringe pattern does not change, but the imaged speckle pattern does. Image subtraction is used to develop a fringe envelope, which can be used to determine strain along at least one axis. The sensitivity of this technique can be less than a wavelength of the applied illumination.

Temperature measurement is accomplished with tool 1220 using phosphor thermometry. Temperature measurements can be achieved by inspection of spectrally and time-resolved luminescence (excited state lifetime) from dilute trivalent lanthanide (RE3+) ions incorporated in the test component. This type of measurement represents a noncontact technique that does not interfere with testing of the object.

A test facility in accordance with the disclosed system and method can take advantage of wide range of data acquisition equipment. The measurement capability includes, but is not limited to the items listed in Table 2 below.

TABLE 2

| Data Acquisition Equipment | |
| --- | --- |
| Temperature | Vibration |
| Thermocouple | Accelerometers |
| Infrared | Velocity sensors |
| Speed sensing | Eddy current probes |
| Eddy current | Optical (laser) |
| Optical | Strain gages |
| High speed video | Static |
| Air flow | Rotating (slip-ring) |
| Pressure and vacuum | Radial Growth |
| | Eddy current probes |
| | Optical (laser) |

All data can be recorded digitally so it can easily be accessed and analyzed using digital equipment.

As indicated above, test section 1200 includes a window 1222 to permit optical inspection of the test component and test chamber. Window 1222 is specially formed to withstand high temperatures and pressures existent in test section 1200. According to one embodiment, window 1222 is composed of sapphire or high temperature quartz. Window 1222 may be provided to give line of sight access to the surface of the article under test. Under some exemplary test conditions a surface of window 1222 can be contoured to accommodate various aerodynamic and angle of incidence parameters. The optical inspection equipment can be set up to compensate for the lens effect of curved windows.

While test facility configurations have been presented where the test component is generally static, the disclosed system and method can also be implemented using a spin test rig, in which the test component is rotated at high velocities to emulate the mechanical stress induced on gas turbine engine components during operation. In either a stationary or rotating approach, test components can be cascaded along the direction of fluid flow to emulate component conditions within them operating gas turbine engine. Spin test rig technology is available from commercial providers, such as Test Devices Inc. of Hudson, Mass.

For example, the disclosed system and method can be implemented in a test facility that includes spin test systems installed in reinforced concrete test cells that are used for centrifugal stress testing. Such spin test systems can be used in production or manufacturing of high-performance gas turbine engine components. A spin test system can employ specialized measurement equipment, such as those developed by Test Devices Inc., of Hudson, Mass. Such specialized equipment may be employed to obtain the following types of measurements.

Temperature—Thermocouple, infrared
Vibration—Accelerometers, velocity sensors, eddy current probes, optical (laser)
Speed sensing—Eddy current, optical
Strain gages—Static, rotating (slipring)
High speed video
Air flow
Pressure and vacuum
Growth—Eddy current probes, optical (laser)

Spin test rigs can be configured to operate using air turbines that spin at a relatively high speed. Such air turbines are often powered using compressed air, the viable of which can be significant. Accordingly, relatively large air compressors are often used to operate air turbines in spin test rigs. The compressors can provide more air than is normally used for testing, and the excess can be provided to a test chamber or turbocompressor in accordance with the disclosed system and method. Additional compressed air can be obtained when the spin test rig is driven by a high speed electric motor.

In accordance with an embodiment of the disclosed system and method, a test component can be arranged in a stationary configuration relative to the test chamber. Alternately, or in addition, the test component can be arranged to move during testing, such as by being rotated about an axis using a rotational motor with a drive shaft coupled to the test component. For example, the rotational motor may be used to rotate or spin the test component about an axis to emulate mechanical stress imparted to components of an operating gas turbine engine. The rotational motor may be used to change the aspect of the test component presented to the high temperature, high mass flow fluid applied to the test chamber. Various test components can be cascaded within the test chamber to simulate operating conditions and configurations of a gas turbine engine hot section. The test component(s) can be instrumented relatively easily to permit thermal mapping and strain mapping, which is currently difficult or impracticable in an operating engine.

The test specimens may be composed of materials representative of gas turbine engine hot section materials. The specimens may be coated or uncoated in whole or in part, with a layer or layers of materials that have characteristics related to gas turbine engine hot section operation. Test specimens may be actual components, or specimens/samples of representative component geometry, such as blade or vane sections or models. The test facility supports the parameters listed in Table 3 below.

TABLE 3

Test Facility Parameters

| Parameter | Minimum | Possible |
| --- | --- | --- |
| Surface Temperature | 2,000° F. | Up to 3200 F. static 3080° F. relative |
| Through-Wall Gradient | Several hundred | Up to 400° F. |
| Automatic cycling & Transient Capability | 160° F./s | 160° F./s |
| Geometry | Representative turbine airfoil materials and geometry including TBC's | (same) plus actual components or component samples, with representative cooling holes |
| Compressive and tensile loading capacity | 5000 lb | 5000 lb |
| Representative velocities | | Up to .8 Mach |
| Pressures | | Up to 30 Atm |

The above described test facility provides a more accurate simulation of, for example, blade/vane service conditions to help calibrate service life and durability models for such gas turbine engine components. Moreover, the test facility supports the industry need for more accurate physical testing as a foundation for development of effective modeling systems to predict blade durability without the exceptionally expensive and time consuming engine tests used presently. The test facility can help to uncover some of the complex interactions between fluid dynamics and materials science that take place in a gas turbine engine. The test facility permits improved modeling and more rapid prototyping and production of advanced performance engine components.

The above described test facility is designed with a focus on economic operation. For example, if a through wall heat flux were to be transferred to a blade by flow of hot gas through a full width blade passage, only about 0.1% of the energy flow would be transferred through the blade wall, and the operating cost would approach $6000.00 per hour. Apparently, a test chamber passage is provided in accordance with the disclosed system and method that limits the flow of hot gas and recirculates the energy of the gas effectively to limit the total cost per hour of the test. Such a configuration is those treated in test chamber 1000 shown in FIG. 10.

In comparison with the operation of practical gas turbine engines, a very large amount of energy is generated in conjunction with the high energy flux imposed on engine components. For example, the combustor energy flux in engines of interest is on the order of 40,000 kW. If a test method were to use such a power level, the energy cost would be on the order of $6,000/hr. With the presently disclosed system and method, power cost is reduced by approximately two orders of magnitude to create an affordable test method.

The presently disclosed system and method creates a high temperature gradient across a thin wall of a typical turbine blade, for example. Typical heat flux through a blade wall is 5 megawatts per meter squared or less. The surface area of a typical military engine blade is about 0.008 m2, so the total heat flux through the blade wall is about 0.008*5=0.04 mW or 40 kW. At $0.15/kW-hr, the operating cost for the desired through-wall heat flux can be about $6.00 per hour. Since the rig is not typically 100% efficient, the operating cost may be higher. However, a cost comparison with a small gas turbine engine test shows the significant cost and efficiency advantages of the above described test facility.

In one embodiment of the presently disclosed test facility, electric power for the supply compressors is about 675 kW. The cost of electricity and maintenance for these compressors is approximately $0.20/kW-hr, so the hourly cost of the supply air is $135.

In an embodiment of the presently disclosed test facility, a turbocharger can produce ambient pressure at about 900° F. with a mass flow 4 lb/sec. The desired fuel flow is that amount used to heat the above amount of air to the above temperature. At 900° F., the heat content of air is about 200 BTU/lb above ambient. Accordingly, the fuel consumption of the test facility is approximately 800 BTU/sec, or about 850 kW at the above temperature and flow. Using the low heating value of fuel, about 145,000 BTU/gallon, the fuel flow is estimated at 20 gallons/hour. For #2 diesel fuel, this will be about $60.00 per hour. With fuel and electricity costs of about $195.00 per hour and a technician cost on the order of $30.00 per hour, the price of running the test facility, fully burdened, is roughly $510 per hour for a single blade. Assuming 3 minutes per TMF cycle and 5000 cycles, estimated price per blade evaluation test is about $127,000. This cost represents a relatively small fraction of the cost of testing blade designs in an engine. The presently disclosed test facility provides significant program advantages in both cost and schedule. Given the affordability of these tests, multiple blade designs can be evaluated in the period now used for a single iteration. In addition, the presently disclosed his facility has a low test event risk. Blade failure in an irreplaceable test engine is a high risk event because of the damage caused to the engine. In the presently disclosed test facility, such an event becomes a valuable data point.

The test facility can reproduce representative local levels of temperature, temperature gradient, and strain outside a running engine. The test facility permits the generation of sufficient heat flux across a relatively thin wall of a test component such as a blade to duplicate the thermal gradient and material temperature of blades in engine conditions. The test facility creates gas temperatures in the test section well above normal melting temperatures of metallic materials. Accordingly, surfaces exposed to high temperatures can be cooled or can be fabricated from refractory materials to withstand the high temperature values.

The disclosed system and method represents a significant effect on ongoing engine development programs, and has the potential to streamline future development programs. A cost effective, accurate test rig coupled with improved OEM design & lifting models is likely to reduce the number of design iterations for turbine components—saving millions of dollars in design and test costs. More importantly, improvements in understanding and prediction capability for TMF can result, increasing the chance of reaching full-life goals for the hot section. Such capability represents a profound change in engine development, as no fighter engine program has yet met full hot section life from its initial design point. Most engine programs meet half-life, at best, and typically employ very expensive hot section redesigns and retrofit programs to try to restore a full 4300 TAC life. Reaching full-life upon the initial production design point can result in savings of tens, or hundreds of millions of dollars.

Better TMF and film cooling understanding also benefits legacy engine systems. Hot section durability continues to plague these engines and engine hot section maintenance is routinely among the top cost drivers for the USAF maintenance budget. Turbine component failures, primarily blade failures, are also among the leading causes of engine mishaps. Programs such as PSAR are focused on the improvement of fleet safety, reliability and cost reduction through the development and application of technology. Newer engines such as the F119 still suffer from partial turbine life durability and immature designs, resulting in the aforementioned expensive redesign & retrofit to reach full life and robust safety margins. Older, more stable engines such as the F100 & F110 can benefit from depot interval extension programs to achieve life cycle cost reduction. Turbine durability and lifting can be a fundamental part of these programs to achieve the desired cost reduction goals. A test facility has described within the presently disclosed system and method can help provide the tools, methods and data to achieve these desired goals.

The above described test facility can also be an extremely valuable asset for research and development in a number of critical fields, such as thermal barrier coatings, turbine blade materials, cooling hole geometries, internal cooling passage designs, blade wall thicknesses and airfoil geometries. It is contemplated that an experimental blade/vane component section can be tested using the disclosed system and method, as well as an actual component itself. Furthermore, the disclosed concepts may be used in a rotating test rig, thereby providing the ability to test actual airfoil components with realistic strain gradients.

The costs of such a test can realistically fall in the range of spin testing costs, making TMF spin testing a very affordable and attractive substitute for the current costly process of empirical, iterative component design and testing. The cost advantages of the disclosed system and method are significant, as there is currently considerable expense for designing and testing turbine blade/vane components, for example. The expense is due to the lack of validated design models that can accommodate TMF and cooling film phenomena in hot section components. Furthermore, hot section durability and maintenance is a key cost and production availability influence for most gas turbine engine applications, such as military, commercial or power generation. By better understanding the dynamics of TMF, film cooling, and their relation to life expectancy, the industry can establish a new paradigm that can increase usable life of these components. By permitting OEMs to offer their customers a more durable product, the customers can share in savings for both in materiel purchases and reduced maintenance.

It should be emphasized that the above-described embodiments of the present invention are possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

REFERENCES

The following five (5) references are hereby incorporated herein by reference.
1. Engler-Pinto, C. C., Jr Sehitoglu, H., and Maier, H. J., "Cyclic Behavior of A1319-T7B Under Isothermal and Non-Isothermal Conditions," Thermalmechanical Fatigue Behavior of Materials: 4th Volume, ASTM STP 1428, M. A. McGaw, S. Kalluri, J. Bressers, and S. D. Peteves, Eds., ASTM International, West Conshohocken, Pa., 2002.
2. Bonacuse, P. J. and Kalluri, S., "Cyclic Deformation Behavior of Haynes 188 Superalloy Under Axial-Torsional Thermomechanical Loading", Thermomechanical Fatigue Behavior of Materials: 4th Volume, ASTM STP 1428, M. A. McGaw, S. Kalluri, J. Bressers, and S. D. Peteves, Eds., ASTM International, West Conshohocken, Pa. 2002.
3. Christ, H. J., Teteruk, R., Jung, A., and Maier, H. J., "Using Fracture Mechanics Concepts for a Mechanism-Based Prediction of Thermomechanical Fatigue Life", Thermomechanical Fatigue Behavior of Materials: 4th Volume, ASTM STP 1428, M. A. McGaw, S. Kalluri, J. Bressers, and S. D. Peteves Eds., ASTM International, West Conshohocken, Pa. 2002.
4. Kong, C. N., Bullough, C. K. and Smith, D. J., "Thermomechanical Response of Single Crystal Nickel-base Superalloy CM186 SX", "Thermomechanical Fatigue Behavior of Materials: 4th Volume, ASTM STP 1428, M. A. McGaw, S. Kalluri, J. Bressers, and S. D. Peteves, Eds., ASTM International, West Conshohocken, Pa., 23 Jun. 2003.
5. Affeldt, E. E., Hammer, J. Huber, U., and Lundblad, H., "Analysis of Thermal Gradients during Cyclic Thermal Loading under High Heating Rates", Thermomechanical Fatigue Behavior of Materials: 4th Volume, ASTM STP 1428, M. A. McGaw, S. Kalluri, J. Bressers, and S. D. Peteves, Eds., ASTM International, West Conshohocken, Pa. 2003.

What is claimed is:

1. A system for imposing a relatively large thermal gradient on a test object, comprising:
    a turbocharger having a drive turbine coupled to a compressor for driving the compressor to provide a compressed fluid;
    a combustor having an input coupled to an output of the compressor and operable to combust fuel with the compressed fluid from the compressor to produce a high temperature compressed fluid;
    a test structure for housing the test object and coupled to an output of the combustor such that the high temperature compressed fluid is directed toward the test object; and
    a duct section coupled between an output of the test structure and the drive turbine of the turbocharger such that exhaust fluid from the test structure can drive the drive turbine of the turbocharger.

2. The system according to claim 1, further comprising a heat exchanger having a first channel being interposed between the output of the test structure and the drive turbine for receiving the exhaust fluid and extracting thermal energy therefrom.

3. The system according to claim 2, wherein the heat exchanger further comprises a second channel being interposed between the output of the compressor and the combustor for receiving the compressed fluid, the first and second channel being thermally coupled to permit thermal energy extracted from the exhaust fluid to be transferred to the compressed fluid.

4. The system according to claim 1, further comprising a compressed fluid source coupled to an input of the compressor for supplying a compressed fluid input to the compressor.

5. The system according to claim 4, wherein the compressed fluid source is an industrial compressor.

6. The system according to claim 4, wherein the compressed fluid source is another compressor of another turbocharger.

7. The system according to claim 6, wherein the another turbocharger further comprises another drive turbine being coupled to an output of the drive turbine to permit an exhaust from the drive turbine to drive the another drive turbine of the another turbocharger.

8. The system according to claim 6, further comprising an intercooler coupled between an output of the another compressor of the another turbocharger and the input of the compressor of the turbocharger for cooling the compressed fluid input supplied to the compressor of the turbocharger.

9. The system according to claim 1, further comprising a cooling fluid source coupled to the test object to provide impingement cooling to the test object.

10. The system according to claim 9, wherein the test object further comprises an internal cavity, the cooling fluid source being communicatively coupled to the internal cavity.

11. The system according to claim 10, further comprising a structure in the internal cavity, configured and arranged to direct impingement cooling within the internal cavity.

12. The system according to claim 11, wherein the impingement cooling is non-uniform.

13. The system according to claim 11, wherein the structure is a wall, whereby the test object has a double wall construction.

14. The system according to claim 1, wherein the test object further comprises one or more of a gas turbine engine blade, vane, blade model or vane model.

15. The system according to claim 1, wherein the test structure further comprises a test chamber having a wall contour substantially similar to the test object.

16. The system according to claim 15, further comprising a relatively small clearance between the test object and the wall contour such that a flow of the high temperature compressed fluid is limited to an area around a perimeter surface of the test object.

17. The system according to claim 1, wherein the test structure further comprises a high temperature window arranged and configured to permit optical inspection of the test object.

18. The system according to claim 17, wherein the high temperature window is one or more of composed of quartz or has a curved contour.

19. The system according to claim 17, further comprising optical inspection instrumentation optically coupled to the test object through the high temperature window.

20. The system according to claim 9, further comprising control inputs being coupled to a control system for controlling characteristics of the high temperature compressed fluid and the impingement cooling.

21. The system according to claim 20, wherein the control system is operable to independently control characteristics of the high temperature compressed fluid or the impingement cooling.

22. A method for providing a relatively large thermal gradient to a test object, comprising:
    providing a compressed fluid and a fuel to a combustor;
    combusting a mixture of fuel and compressed fluid to produce a high temperature compressed fluid;

directing an output of the combustor toward the test object to expose the test object to the high temperature compressed fluid;

directing a high temperature compressed fluid exhaust having passed the test object to a drive turbine configured and arranged to drive a compressor to contribute to producing the compressed fluid; and providing the compressed fluid from the compressor to the combustor.

23. The method according to claim 22, further comprising recuperating thermal energy from the exhaust.

24. The method according to claim 23, further comprising transferring a portion of the recuperated thermal energy to the compressed fluid.

25. The method according to claim 22, further comprising supplying a compressed fluid input to the compressor.

26. The method according to claim 25, further comprising using an industrial compressor to supply the compressed fluid input.

27. The method according to claim 25, further comprising using another turbocharger to supply the compressed fluid input.

28. The method according to claim 27, further comprising directing an exhaust from the drive turbine of the turbocharger to another drive turbine of the another turbocharger.

29. The method according to claim 27, further comprising cooling the compressed fluid input supplied to the compressor of the turbocharger.

30. The method according to claim 22, further comprising providing impingement cooling to the test object.

31. The method according to claim 30, further comprising:
configuring the test object to have an internal cavity; and
providing the impingement cooling to the internal cavity.

32. The method according to claim 31, further comprising providing a structure for directing impingement cooling within the internal cavity.

33. The method according to claim 32, further comprising using the structure to provide non-uniform impingement cooling within the internal cavity.

34. The method according to claim 32, further comprising forming the structure as a wall, whereby the test object has a double wall construction.

35. The method according to claim 22, further comprising forming the test object as one or more of a gas turbine engine blade, vane, blade model or vane model.

36. The method according to claim 22, further comprising providing a test chamber wall contour around the test object, the wall contour having a shape substantially matching that of the test object.

37. The method according to claim 36, further comprising configuring the test chamber wall contour to have a relatively small clearance between the test object and the wall contour such that a flow of the high temperature compressed fluid is limited to an area around a perimeter surface of the test object.

38. The method according to claim 22, further comprising optically inspecting the test object.

39. The method according to claim 30, further comprising independently controlling characteristics of the high temperature compressed fluid and the impingement cooling.

40. A system for imposing a relatively large thermal gradient on a test object, comprising:
a compressed fluid source for supplying compressed fluid;
a thermal recuperator coupled to the compressed fluid source for transferring thermal energy to heat the compressed fluid;
a combustor coupled to the recuperator and operable to combust fuel with the heated compressed fluid from the recuperator to produce a high temperature compressed fluid;
a test section for housing the test object and coupled to an output of the combustor such that the high temperature compressed fluid is directed toward the test object; and
an output of the test section being coupled to the recuperator to provide thermal energy for transfer by the recuperator.

* * * * *